(12) United States Patent
Hirayama

(10) Patent No.: US 7,370,821 B2
(45) Date of Patent: May 13, 2008

(54) SPOOL ASSEMBLY FOR A DUAL BEARING REEL

(75) Inventor: Hirokazu Hirayama, Sakai (JP)

(73) Assignee: Shimano Inc., Sakai (JP)

( * ) Notice: Subject to any disclaimer, the term of this patent is extended or adjusted under 35 U.S.C. 154(b) by 329 days.

(21) Appl. No.: 11/156,579

(22) Filed: Jun. 21, 2005

(65) Prior Publication Data
US 2006/0006267 A1    Jan. 12, 2006

(30) Foreign Application Priority Data

| Jun. 25, 2004 | (JP) | ............................ 2004-187483 |
| Jun. 25, 2004 | (JP) | ............................ 2004-187484 |
| Jun. 25, 2004 | (JP) | ............................ 2004-187485 |
| Jun. 25, 2004 | (JP) | ............................ 2004-187486 |

(51) Int. Cl.
*A01K 89/01* (2006.01)

(52) U.S. Cl. .................................................. 242/319

(58) Field of Classification Search ................ 242/319, 242/322
See application file for complete search history.

(56) References Cited

U.S. PATENT DOCUMENTS 3,974,977 A * 8/1976 Kamikawa .................. 242/319
4,058,269 A * 11/1977 Nurmse ...................... 242/319
4,061,288 A * 12/1977 Karlsson et al. ............. 242/319
4,805,849 A * 2/1989 Nanbu ........................ 242/319
6,575,392 B1 * 6/2003 Hong ......................... 242/319
6,588,693 B2 * 7/2003 Andren et al. ............... 242/322

FOREIGN PATENT DOCUMENTS

JP    08-70739    3/1996

* cited by examiner

*Primary Examiner*—Evan H. Langdon
(74) *Attorney, Agent, or Firm*—Global IP Counselors, LLP

(57) ABSTRACT

A spool assembly for a dual bearing reel includes a tubular bobbin, first and second flange portions, first and second annular portions, and first and second fishing line entry prevention portions. The first and second flange portions project radially outward from opposite ends of the bobbin. Inner peripheries of the first and second annular portions cover the first and second flange portions. The first and second fishing line entry prevention portions project from outer peripheries of the first second flange portions. The first and second fishing line entry prevention portions are provided across a slight gap between tip portions of the first and second annular portions. The first and second fishing line entry prevention portions prevent fishing line from entering between the first flange portion and a first side plate and between the second flange portion and the second side plate.

18 Claims, 17 Drawing Sheets

SPOOL ASSEMBLY FOR A DUAL BEARING REEL

CROSS-REFERENCE TO RELATED APPLICATIONS

This application claims priority to Japanese Patent Application Nos. 2004-187483, 2004-187484, 2004-187485, and 2004-187486. The entire disclosures of Japanese Patent Application Nos. 2004-187483, 2004-187484, 2004-187485 and 2004-187486 are hereby incorporated herein by reference.

BACKGROUND OF THE INVENTION

1. Field of the Invention

The present invention generally relates to a spool assembly. More specifically, the present invention relates to a spool assembly for a dual bearing reel that takes up and releases fishing line.

2. Background Information

Generally, a dual-bearing reel is comprised of a reel unit having a handle and a spool that is rotatively mounted to the reel unit. The spool has a bobbin and flange portions. The flange portions are provided at both ends of the bobbin. The bobbin is for winding fishing line around the outer periphery thereof. The bobbin includes a cylindrical portion and a boss. The boss is formed on the inner peripheral side of the cylindrical portion and mounted to a spool shaft. Fishing line is wound around the outer periphery of the cylindrical portion. The flange portions have diameters that are larger than that of the bobbin. Each flange portion projects outward in the radial direction on both ends of the bobbin. The flange portions are inclined such that the diameters gradually increase outward in the axial direction.

In addition, the reel unit includes a pair of side plates and a pair of ring portions. The ring portions are configured and arranged to project inward in the axial direction and oppose the pair of side plates. The ring portions cover the outer peripheries of the flange portions. A spool is mounted between the pair of side plates. The side plates face each other across a predetermined gap. Furthermore, in order to prevent fishing line from entering between the flange portions and the ring portions, it is known to form protrusions that project radially outward on the peripheral edge of the flange portions. (See, for example, Japanese Publication No. H8-70739.)

These types of protrusions are formed so that, for example, the outer peripheral surfaces of the tip portions thereof are completely covered by the inner peripheral portion of the ring portions. A slight gap is produced between the protrusions and the ring portions. In addition, on a comparatively small reel, whose spool maximum line winding diameter is between 25 mm and 30 mm, the protrusions are formed so that the projection heights thereof are between 0.5 mm and 1.0 mm. By arranging these protrusions on the flange portions, slack fishing line will come into contact with the protrusions. The protrusions can restrict the movement of the fishing line in the axially outward direction. Thus, the entry of the fishing line between the flange portions and the ring portions can be prevented.

With a conventional spool, the protrusions are formed to project from the outer periphery of the flange portions. The flange portions are slanted so that the diameters of the protrusions gradually increase outward in the axial direction. Thus, because it is easy for slack fishing line to move axially outward along the slanted surfaces when both ends of the flange portions are slanted, it will be easy for slack fishing line to come into contact with the protrusions formed on the outer peripheries of the flange portions. Thus, when fishing line repeatedly comes into contact with the protrusions, slack fishing line may cross over the protrusions and enter between the flange portions and the ring portions or side plate.

In addition, when the protrusions are arranged so as to be perpendicular to the rotational axis of the spool, the side surfaces on the bobbin side of the protrusions (the surfaces that contact the fishing line) will intersect at an obtuse angle with the outer peripheral surfaces of the flange portions because the flange portions are slanted. Thus, when the side surfaces on the bobbin side of the protrusions intersect at an obtuse angle with the outer peripheral surfaces of the flange portions, it will be easy for slack fishing line to move outward in the axial direction from the outer peripheral surfaces of the flange portions and along the side surfaces of the bobbin side of the protrusions. Thus, fishing line may enter between the flange portions and the ring portions or side plates.

In view of the above, it will be apparent to those skilled in the art from this disclosure that there exists a need for an improved spool assembly that prevents fishing line from entering between a flange portion and a side plate. This invention addresses this need in the art as well as other needs, which will become apparent to those skilled in the art from this disclosure.

SUMMARY OF THE INVENTION

An object of the present invention is to impede fishing line from entering between the flange portions and the side plates of a spool assembly of a dual bearing reel.

The spool assembly for a dual bearing reel according to a first aspect of the present invention is a spool assembly for a dual bearing reel that includes a tubular bobbin, first and second flange portions, first and second annular portions and first and second fishing line entry prevention portions. The tubular bobbin has a first end portion, a second end portion and an outer periphery that supports fishing line. The first flange portion projects radially outward from the first end portion of the bobbin. The first flange portion has a first diagonal portion and a first cylindrical portion. The first diagonal portion extends axially outward from the first flange portion with a gradually increasing diameter. The first cylindrical portion extends axially outward from the first diagonal portion with a uniform diameter. The second flange portion projects radially outward from the second end portion of the bobbin. The second flange portion has a second diagonal portion and a second cylindrical portion. The second diagonal portion extends axially outward from the second flange portion with a gradually increasing diameter. The second cylindrical portion extends axially outward from the second diagonal portion with a uniform diameter. The first annular portion projects axially inward. The first annular portion has a first tip portion and an inner periphery that covers the first cylindrical portion. The second annular portion projects axially inward. The second annular portion has a second tip portion and an inner periphery that covers the second cylindrical portion. The first fishing line entry prevention portion projects from an outer periphery of the first cylindrical portion. The first fishing line entry prevention portion is arranged across a first gap from the first tip portion. The second fishing line entry prevention portion projects from an outer periphery of the second cylindrical portion. The second fishing line entry prevention portion is arranged across a second gap from the second tip portion.

The fishing line entry prevention portions that project from the outer peripheries of both ends of the cylindrical portions of the flange portions restrict the movement of the slack fishing line in the axially outward direction. The fishing line entry prevention portions prevent the fishing line from entering between the flange portions and the side plates. Because the fishing line entry prevention portions are arranged to project from the cylindrical portions, it will be more difficult for fishing line to move axially outward when compared to the fishing line entry prevention portions on the slanted portions as in the conventional spool assembly. In particular, because the fishing line entry prevention portions are substantially perpendicular to the outer peripheral surfaces of the cylindrical portions, it will be more difficult for fishing line to move axially outward when compared to the fishing line entry prevention portions and the slanted portions of the flange portions that intersect at obtuse angles as in the conventional spool assembly. Thus, by arranging fishing line entry prevention portions to project from the cylindrical portions of the flange portions on a spool of a dual bearing reel, it can be made more difficult for fishing line to enter between the flange portions and the side plates.

The spool according to a second aspect of the present invention is the spool assembly according to the first aspect of the present invention, wherein the fishing line entry prevention portions are arranged so as to be substantially perpendicular with the outer peripheral surfaces of the cylindrical portions of the flange portions. Because the fishing line entry prevention portions are substantially perpendicular to the outer peripheral surfaces of the cylindrical portions, it will be more difficult for fishing line to move axially outward when compared to the fishing line entry prevention portions and the slanted portions of the flange portions that intersect at obtuse angles as in the conventional spool assembly.

The spool assembly according to a third aspect of the present invention is the spool according to the first or second aspect of the present invention, wherein tubular portions are provided between the outer peripheries of the tip portions of the flange portions and the inner peripheral portions of the annular portions. The tip surfaces of the tubular portions are arranged across gaps so as to face the axially outward side surfaces of the fishing line entry prevention portions. The tip surfaces are further axially outward than the end surfaces of the annular portions. Because the opposing surfaces face the fishing line entry prevention portions are formed on the tubular portions on the inner peripheries of the annular portions, fishing line can be prevented from entering further into the interior of the reel unit even if slack fishing line crosses over the fishing line entry prevention portions.

The spool assembly according to a fourth aspect of the present invention is the spool assembly according to the third aspect of the present invention, wherein annular grooves that open laterally so that the end portions of the flange portions will be inserted therein are formed in the tubular portions. Because grooves are arranged so that the end portions of the flange portions are inserted therein and the grooves are recessed further axially outward than the opposing surfaces that face the fishing line entry prevention portions, the fishing line that crosses over the fishing line entry prevention portions can be prevented from further entering the interior of the reel unit.

The spool assembly according to a fifth aspect of the present invention is the spool assembly of the third or fourth aspect of the present invention, wherein at least one of the pairs of the annular portions or tubular portions is unitarily formed. Because the annular portion and the tubular portion are unitarily formed, the total number of parts can be reduced.

The spool assembly according to a sixth aspect of the present invention is the spool assembly of any of the third through fifth aspects of the present invention, wherein one of the annular portions and one of the tubular portions are separately provided. A braking surface is formed on the one tubular portion. Moving members for braking the rotation of the spool can come into contact with the braking surface. By also using the tubular portion as a brake member the diameter of the brake member can be increased even in a small dual bearing reel. Thus, by making the diameter of the brake member larger, the braking force is maintained at a high level because the distance in which the moving members move is increased.

The spool assembly according to a seventh aspect of the present invention is the spool assembly of any of the first through sixth aspects of the present invention, wherein the outermost diameter of the fishing line entry portions is between about 105% and 115% of the maximum line winding diameter of the fishing line that can be wound around the bobbin. The outermost diameter of the fishing line entry prevention portions is between about 105% and 115% of the maximum line winding diameter of the fishing line that can be wound around the bobbin. The projection height of the fishing line entry prevention portion is between about 2.5% and 7.5% of the maximum line winding diameter. Because of this, the fishing line entry prevention portions can be maintained at a sufficient projection height to restrict the movement of the fishing line, without making the projection height of the fishing line entry prevention portions too big. Thus, the increase in weight of the fishing line entry prevention portions can be controlled. Thus, the increase in the inertial force of the spool of a dual bearing reel can be controlled, while making it difficult for fishing line to enter between the flange portions and the side plates.

The spool assembly according to an eighth aspect of the present invention is the spool assembly of the seventh aspect of the present invention, wherein the outermost diameter of the fishing line entry prevention portions is between about 27 mm and 34 mm. The maximum line winding diameter is between about 25 mm and 30 mm. Here, the outermost diameter of the fishing line entry prevention portions is between about 108% and 113% of the maximum line winding diameter. Thus, the inertial force of the spool can be controlled while making it difficult for fishing line to enter between the flange portions and the side plates.

The spool assembly according to a ninth aspect of the present invention is the spool assembly of the seventh or eighth aspect of the present invention, wherein the projection height of the fishing line entry prevention portions is between about 1.0 mm and 2.0 mm. The projection height of the fishing line entry prevention portions is increased so as to be between about 1.0 mm to 2.0 mm. Because the projection height of the fishing line entry prevention portions is formed to be between about 4.0% and 6.7% of the maximum line winding diameter, the increase in the inertial force of the spool can be controlled more easily while making it difficult for fishing line to enter between the flange portions and the side plates.

The spool assembly according to a tenth aspect of the present invention is the spool assembly of any of the seventh through ninth aspects of the present invention, wherein the thickness of the fishing line entry prevention portions is between about 0.1 mm and 0.5 mm. When, for example, the thickness of the bobbin or the flange portions is about 0.5 mm or greater, the thickness of the fishing line entry prevention portions is half or less of the thickness of the bobbin or the flange portions. Thus, the increase in weight of the fishing line entry prevention portions can be optimally controlled.

The spool assembly of an eleventh aspect of the present invention is the spool assembly of any of the seventh through tenth aspects of the present invention, wherein the maximum line winding diameter is equal to the outermost diameter of the flange portions. Forming the cylindrical portions so that the outer peripheral surfaces of the flange portions are flat, for example, allows fishing line to be wound up to the outermost diameter of the flange portions. Because the outermost diameter of the fishing line entry prevention portions is set as a percentage of the outermost diameter of the flange portions, the design of the spool assembly is simplified.

The spool assembly according to a twelfth aspect of the present invention is the spool assembly of any of the seventh through eleventh aspects of the present invention, wherein the outer diameter of the bobbin is between about 20 mm and 28.5 mm. When the outermost diameter of the flange portions is between about 25 mm and 30 mm, the outer diameter of the bobbin is formed so as to be about 80% to 95% of the outermost diameter of the flange portions. Thus, the present invention can be applied when there is a small amount of wound fishing line in a shallow channel spool.

The spool assembly according to a thirteenth aspect of the present invention is the spool assembly of any of the seventh through twelfth aspects of the present invention, wherein the outer diameter of the annular portions is between about 28 mm and 35 mm. When the outermost diameter of the fishing line entry prevention portions is between about 27 mm and 34 mm, the gap between the fishing line entry prevention portions and the annular portions is narrowly formed so as to be about 0.5 mm or less. Thus, it is more difficult for fishing line to enter from the gaps between the fishing line entry prevention portions and the annular portions into the interior.

The spool assembly according to a fourteenth aspect of the present invention is the spool assembly of any of the seventh through thirteenth aspects of the present invention, wherein the gap between the fishing line entry prevention portions and the annular portions is between about 0.1 mm and 0.5 mm. It is more difficult for fishing line to enter from the gaps between the fishing line entry prevention portions and the annular portions into the interior because the gaps are narrowly formed so as to be between about 0.1 mm and 0.5 mm.

The spool assembly according to a fifteenth aspect of the present invention is the spool assembly of any of the first through fourteenth aspects of the present invention, wherein the fishing line entry prevention portions are arranged so that the side surfaces on the bobbin sides thereof are positioned on the bobbin side to include the tip surfaces of the annular portions. The side surfaces of the fishing line entry prevention portions on the bobbin side are arranged so as to be positioned further toward the bobbin side than the tip surface of the annular portions. Thus, the outer peripheral surfaces of the fishing line entry prevention portions will be outwardly exposed and will no longer be completely covered by the inner peripheral surfaces of the annular portions. Thus, because it will be easy for slack fishing line to move outward from the side surfaces of the fishing line entry prevention portions on the bobbin side, i.e., to the tip surface sides of the annular portions, it will be difficult for fishing line to come into contact with the inner peripheral surfaces of the annular portions. Thus, because it will be difficult for fishing line to enter into the gaps between the fishing line entry prevention portions and the annular portions, it will be difficult for fishing line to become caught between the outer peripheral surfaces of the fishing line entry prevention portions and the inner peripheral surfaces of the annular portions. Because of this, it is more difficult for fishing line to enter between the flange portions and the side plates.

The spool assembly according to the sixteenth aspect of the present invention is the spool assembly of the fifteenth aspect of the present invention, wherein the fishing line entry prevention portions are arranged so that the side surfaces on the bobbin sides thereof are aligned with the tip surfaces of the annular portions. It is easier for slack fishing line to move from the side surfaces of the fishing line entry prevention portions on the bobbin side to the tip surface side of the annular portions because the side surfaces on the bobbin sides of the fishing line entry prevention portions are arranged so as to be aligned with the tip surfaces of the annular portions and because stepped portions are no longer produced between the fishing line entry prevention portions and the annular portions.

The spool assembly according to a seventeenth aspect of the present invention is the spool assembly according to the fifteenth aspect of the present invention, wherein the side surfaces of the fishing line entry prevention portions in the axially outward direction are positioned more axially inward than the tip surfaces of the annular portions. It is more difficult for fishing line to enter between the flange portions and the side plates because the side surfaces in the axially inward direction of the fishing line entry prevention portions are arranged to be more inward in the axial direction than the tip surfaces of the annular portions and because slack fishing line can be quickly brought into contact with the fishing line entry prevention portions.

The spool assembly according to an eighteenth aspect of the present invention is the spool assembly of any one of the first through seventeenth aspects of the present invention, wherein the tip portions of the fishing line entry prevention portions are formed to project in a tapered shape. By arranging the tapered portions of the fishing line entry prevention portions to be aligned with the tip surfaces of the annular portions, slack fishing line will more easily move from the side surfaces of the fishing line entry prevention portions on the bobbin side to the tip surface side of the annular portions via the portions more slanted axially inward than the tapered portions.

The spool assembly according to a nineteenth aspect of the present invention is the spool assembly of the eighteenth aspect of the present invention, wherein the tip portions of the pair of annular portions have tapered portions whose diameters increase from the inner peripheral surfaces toward the tip surfaces. The tapered portions are formed so that the end portions on the inner peripheral surface sides thereof are positioned more axially inward than the outermost diameter portions of the tip portions of the fishing line entry prevention portions. Because the tip portions of the taper portions on the inner peripheral sides are positioned more axially inward than the tapered portions of the fishing line entry prevention portions, the gap between the fishing line entry prevention portions and the annular portions will be minimized. Because of this, it will be more difficult for fishing line to enter into the gaps between the fishing line entry prevention portions and the annular portions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

As used herein to describe the present invention, the following directional terms "forward, rearward, left, right, upward, downward, vertical, horizontal, above, below and transverse" as well as any other similar directional terms refer to those directions of a fishing rod equipped with the dual bearing reel in accordance with the present invention. Accordingly, these terms, as utilized to describe the present invention should be interpreted relative to a fishing rod equipped with the present invention from a viewpoint behind the fishing rod and dual bearing reel.

Figure 1:
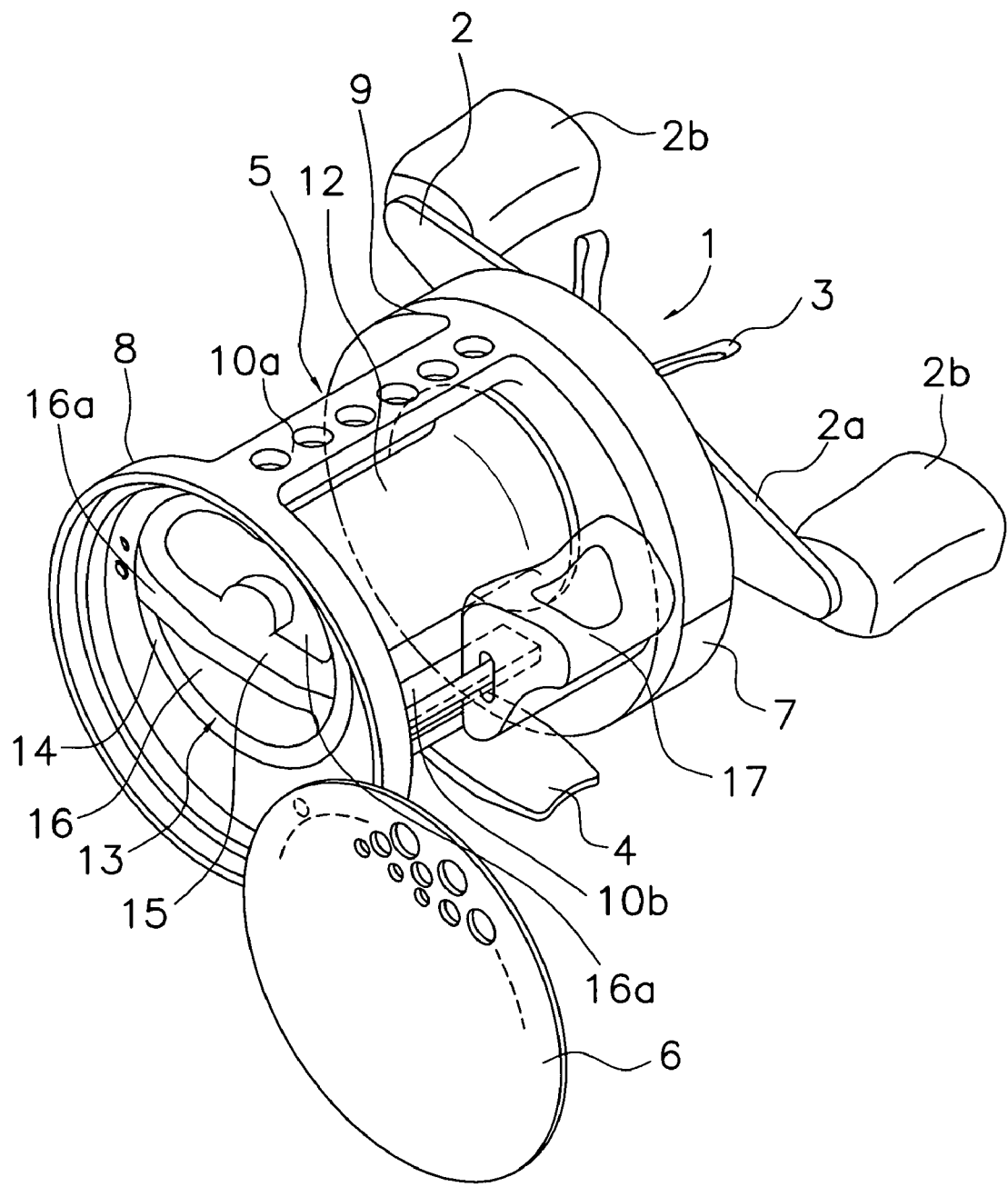
FIG. 1 is a perspective view of a dual bearing reel equipped with a spool assembly in accordance with a first embodiment of the present invention.

Referring initially to FIG. 1, a dual bearing reel is illustrated in accordance with a first embodiment of the present invention. The dual bearing reel includes a reel unit 1, a handle 2 and a star drag 3. The handle 2 is arranged on a side of the reel unit 1. The star drag 3 is arranged on a side of the handle 2 closest to the reel unit 1 and is for adjusting drag.

Figure 2:
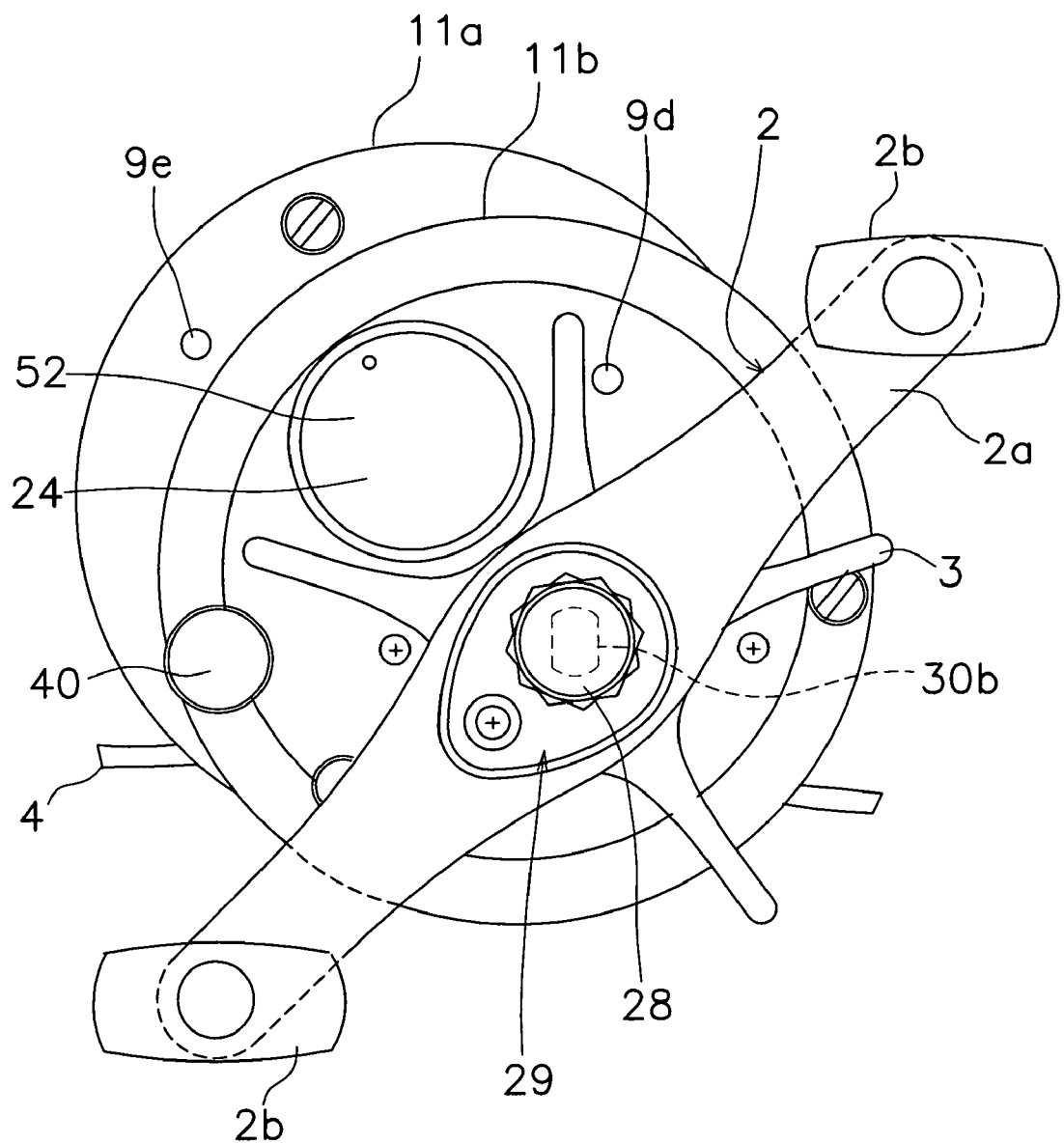
FIG. 2 is a right lateral view of the dual bearing reel illustrated in FIG. 1 equipped with the spool assembly in accordance with a first embodiment of the present invention.
Figure 3:
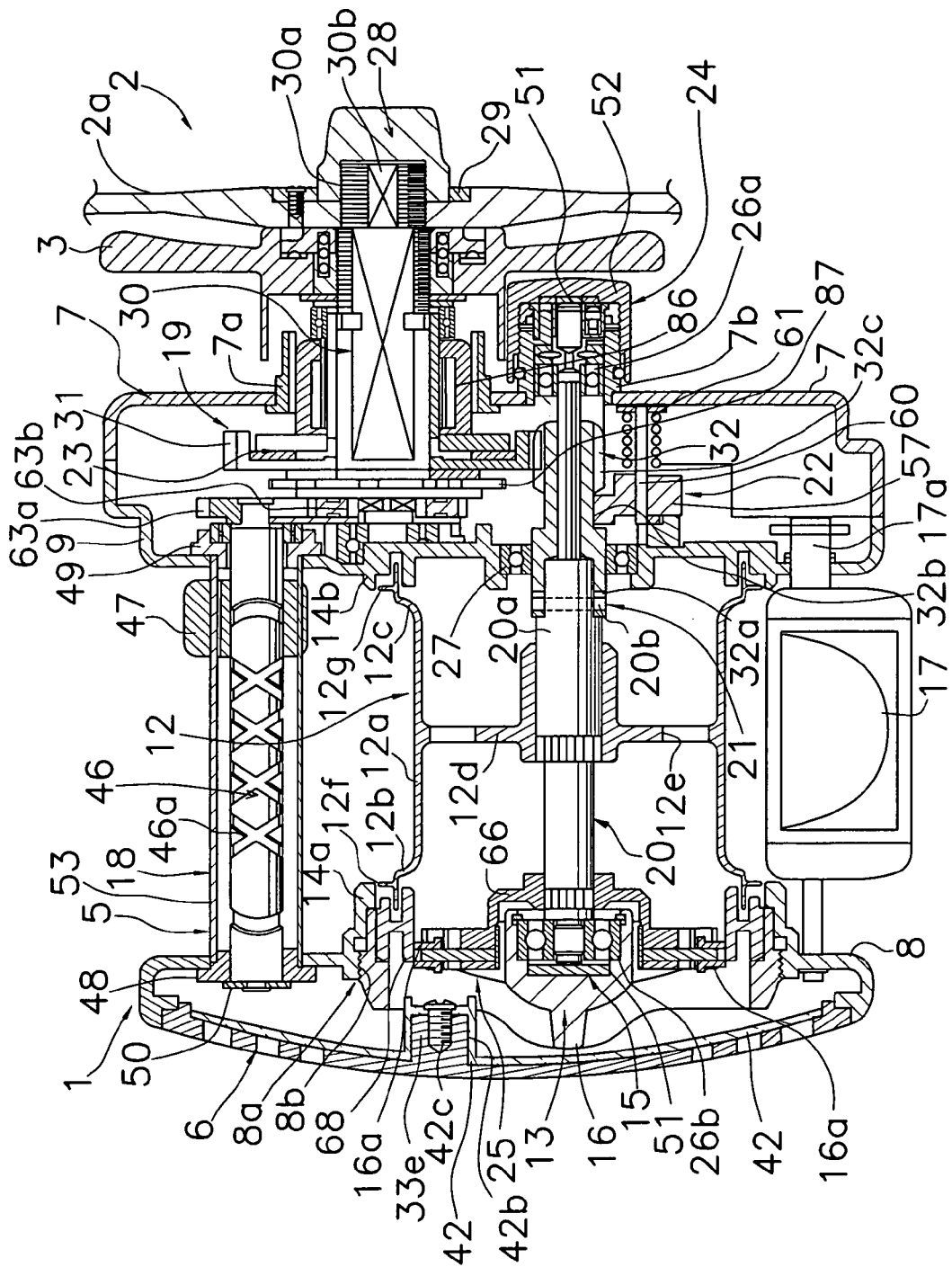
FIG. 3 is a cross-sectional view of the dual bearing reel illustrated in FIGS. 1 and 2 equipped with the spool assembly in accordance with a first embodiment of the present invention.

As shown in FIGS. 1-3, the handle 2 is a double-handle type and has a plate shaped arm portion 2a and knobs 2b. Each of the knobs 2b is rotatably mounted to a respective end of the arm portion 2a.

As shown in FIG. 3, the arm portion 2a is non-rotatably mounted to a right tip of a handle shaft 30 by means of a nut 28. The handle shaft 30 includes a male threaded portion 30a and a parallel chamfered portion 30b. The right tip of the handle shaft 30 has a smaller diameter than the rest of the handle shaft 30. The male threaded portion 30a and the parallel chamfered portion 30b are formed on an outer peripheral surface of the smaller diameter of the handle shaft 30. The nut 28 threads onto the male threaded portion 30a to fasten the arm portion 2a to the handle shaft 30. The nut 28 is prevented from rotating by a raindrop shaped retainer 29. The retainer 29 is made of metal, such as stainless steel, for example.

As shown in FIGS. 1-3, the reel unit 1 is made of a metal, such as an aluminum alloy or a magnesium alloy, for example. The reel unit 1 includes a frame 5, first and second side covers 6 and 7 and a spool assembly. Each of the first and second side covers 6 and 7 is mounted to a respective side of the frame 5. When viewed from the exterior in the spool shaft 20 direction, the first side cover 6 is circular in shape. The shape of the second side cover 7 is that of two eccentric flat disks lying on top of each other, with the two outer rims intersecting one another. The spool assembly includes the spool 12, first and second annular portions 14a and 14b and a spool support portion 13. The spool 12 is for winding fishing line. The spool 12 is rotatably and detachably mounted on the spool shaft 20 inside the reel unit 1.

As shown in FIG. 3, the spool 12, a clutch lever 17 and a level wind mechanism 18 are disposed inside the frame 5. The clutch lever 17 functions as a thumb rest when thumbing the fishing line. The level wind mechanism 18 serves to uniformly wind fishing line around the spool 12. A gear mechanism 19, a clutch mechanism 21, a clutch control mechanism 22, a drag mechanism 23, and a casting control mechanism 24 are disposed between the frame 5 and the second side cover 7. The gear mechanism 19 transmits rotational force from the handle 2 to the spool 12 and to the level wind mechanism 18. The clutch control mechanism 22 controls the clutch mechanism 21 in accordance with the operation of the clutch lever 17. The drag mechanism 23 applies resistance to the spool 12. The casting control mechanism 24 serves to adjust the resistance that occurs when the spool 12 rotates.

Figure 4:
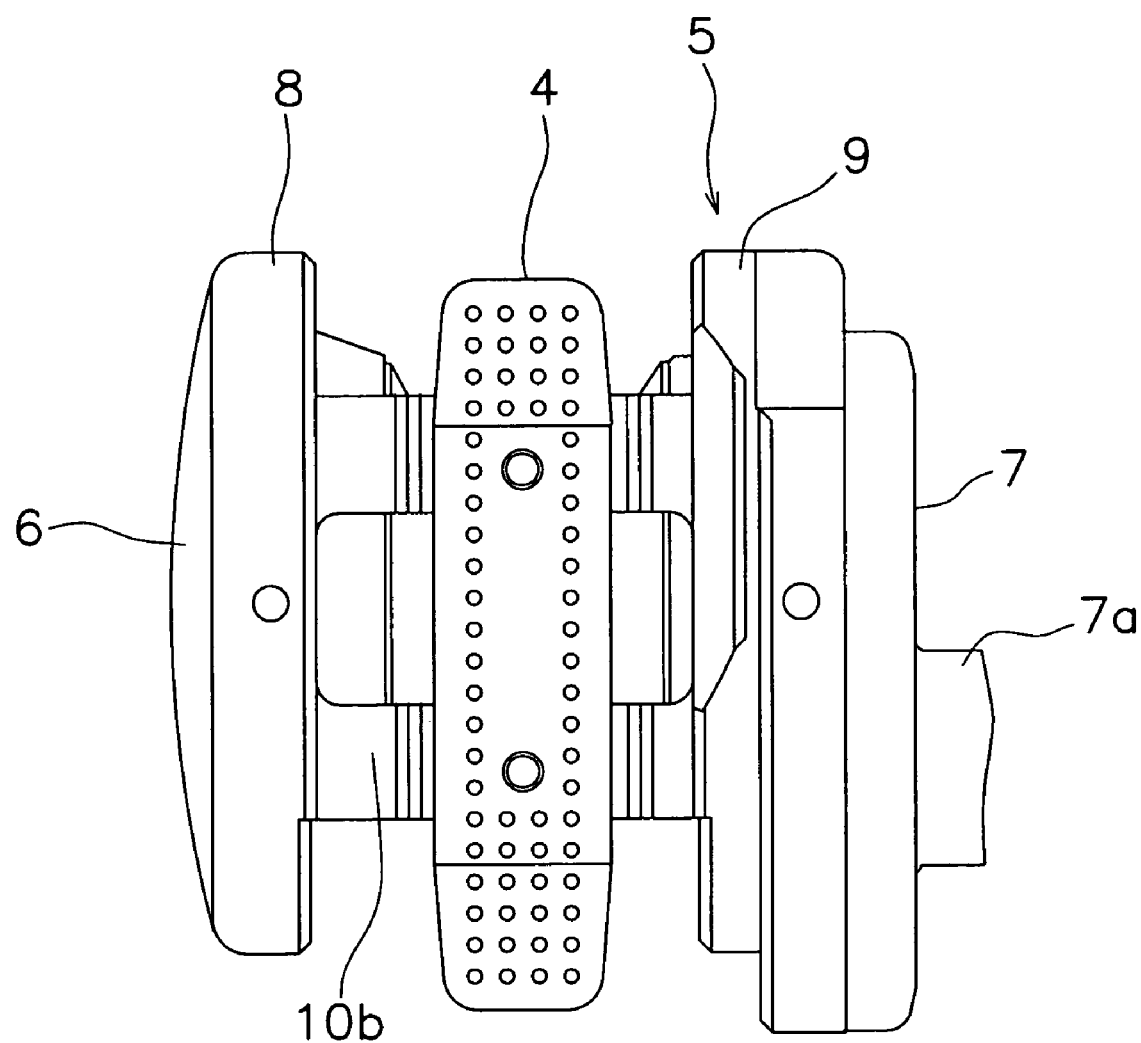
FIG. 4 is a bottom view of the dual bearing reel illustrated in FIGS. 1-3 equipped with the spool assembly in accordance with a first embodiment of the present invention.
Figure 7:
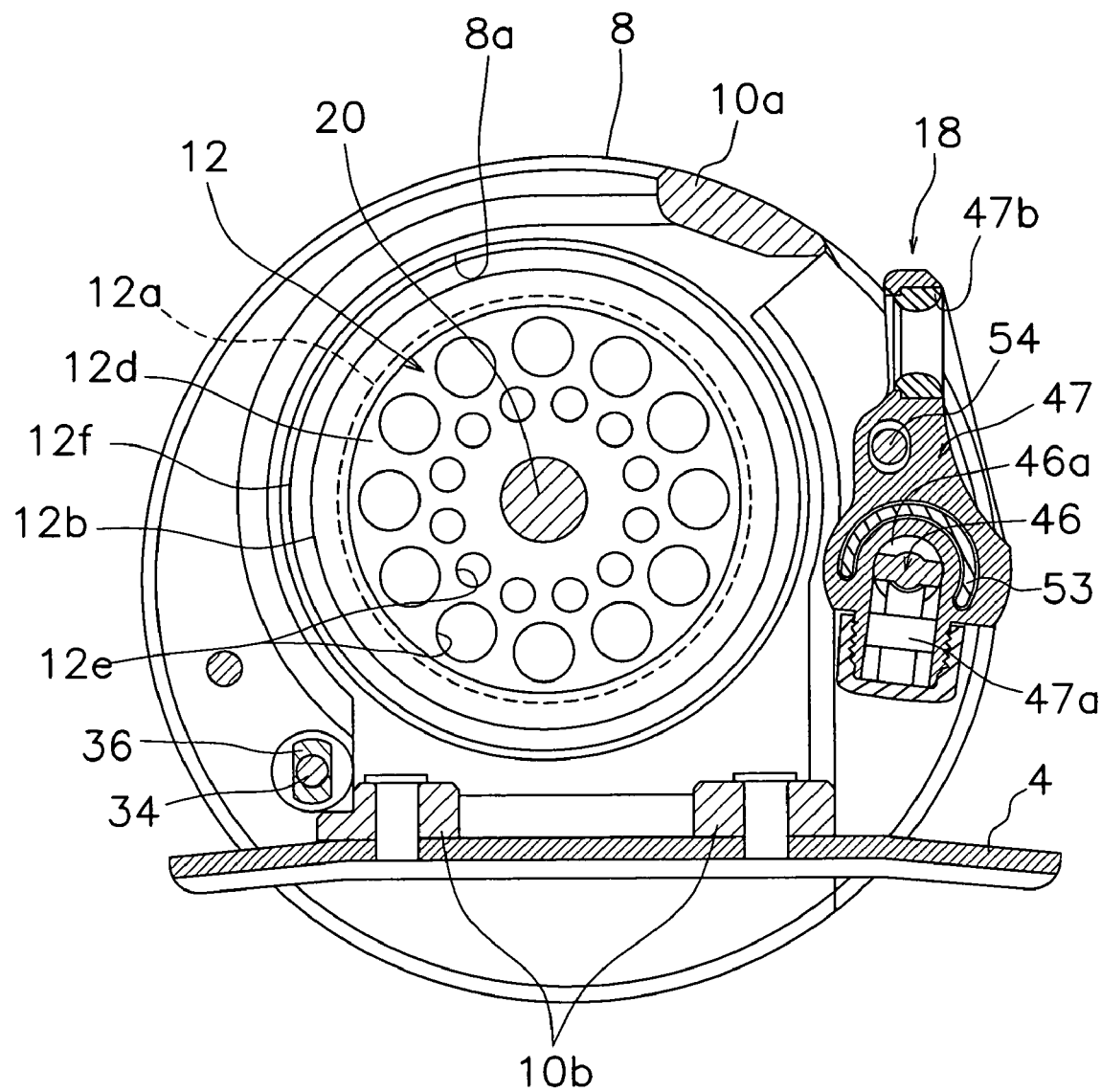
FIG. 7 is a cross-sectional view of the dual bearing reel illustrated in FIGS. 1-6 equipped with the spool assembly in accordance with a first embodiment of the present invention.

As shown in FIGS. 3-5 and 11, the frame 5 includes first and second side plates 8 and 9, upper and lower connecting portions 10*a* and 10*b* and an oblong rod-mounting leg 4. The first and second side plates 8 and 9 are arranged to face each other at a predetermined spacing. The upper and lower connecting portions 10*a* and 10*b* connect the first and second side plates 8 and 9 into one unit. The upper connecting portion 10*a* is arranged in the same plane as the outer perimeters of the first side plate 8 and the second side plate 9. The pair of forward and rear lower connecting portions 10*b* are arranged inward from the outer perimeter. As shown in FIGS. 4 and 7, the oblong rod-mounting leg 4 extends from front to rear, and is riveted to the lower connecting portions 10*b*. The oblong rod-mounting leg 4 is for mounting the reel to a fishing rod. The oblong rod-mounting leg 4 is made of metal, such as, for example, an aluminum alloy.

On the second side plate 9 and the second side cover 7, a first cylindrical portion 11*a* is formed together with a second cylindrical portion 11*b*. The second cylindrical portion 11*b* has substantially the same diameter as the first cylindrical portion 11*a*. The first cylindrical portion 11*a* has a cylindrical first space in the interior thereof. The second cylindrical portion 11*b* has a second space contiguous to the first space in the interior thereof. The outer rim of the second cylindrical portion 11*b* is arranged eccentrically downward towards the front, so that it intersects with the outer rim of the first cylindrical portion 11*a*. The second cylindrical portion 11*b* protrudes in the spool shaft 20 direction from the first cylindrical portion 11*a*. Furthermore, a portion of an outer peripheral surface of the first cylindrical portion 11*a* and the second cylindrical portion 11*b* overlap in the spool shaft 20 direction.

Figure 12:
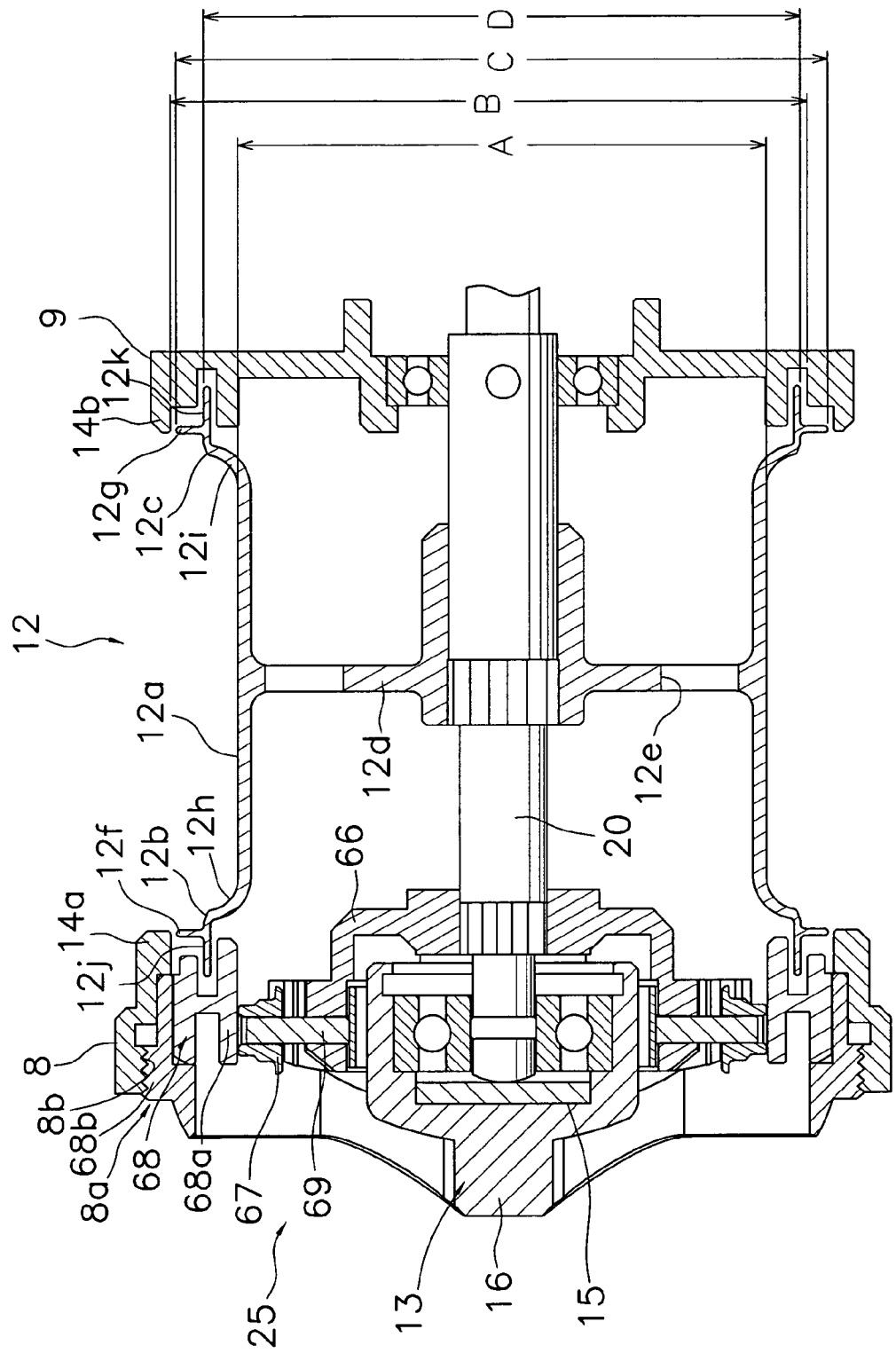
FIG. 12 is an enlarged cross-sectional view of the spool assembly and related components in accordance with a first embodiment of the present invention.
Figure 13:
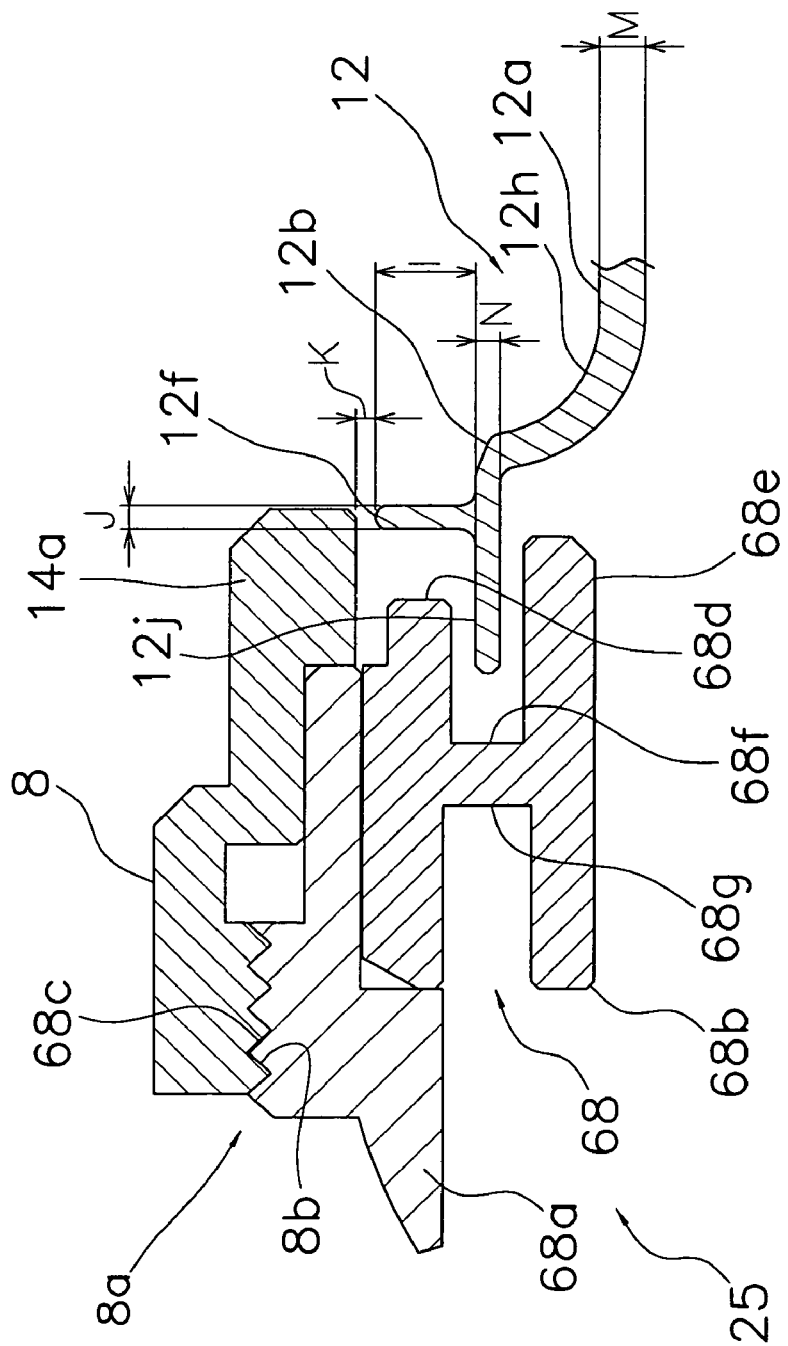
FIG. 13 is an enlarged cross-sectional view of the left side of the spool assembly and related components in accordance with a first embodiment of the present invention.

Referring to FIGS. 12 and 13, in addition, the first side plate 8 is a flat, cylindrical member with a closed end having a space in the interior that is circular when viewed in the spool shaft direction. The first side plate 8 includes a circular opening 8*a* and a female threaded portion 8*b*. The circular opening 8*a* for attaching and detaching the spool 12 is formed slightly above the center of the first side plate 8. The female threaded portion 8*b* is formed on the inner peripheral surface of the opening 8*a*. A spool support portion 13 which supports the left end of the spool shaft 20 (the rotation shaft for the spool 12) is detachably and indirectly mounted to the female threaded portion 8*b*.

Figure 6:
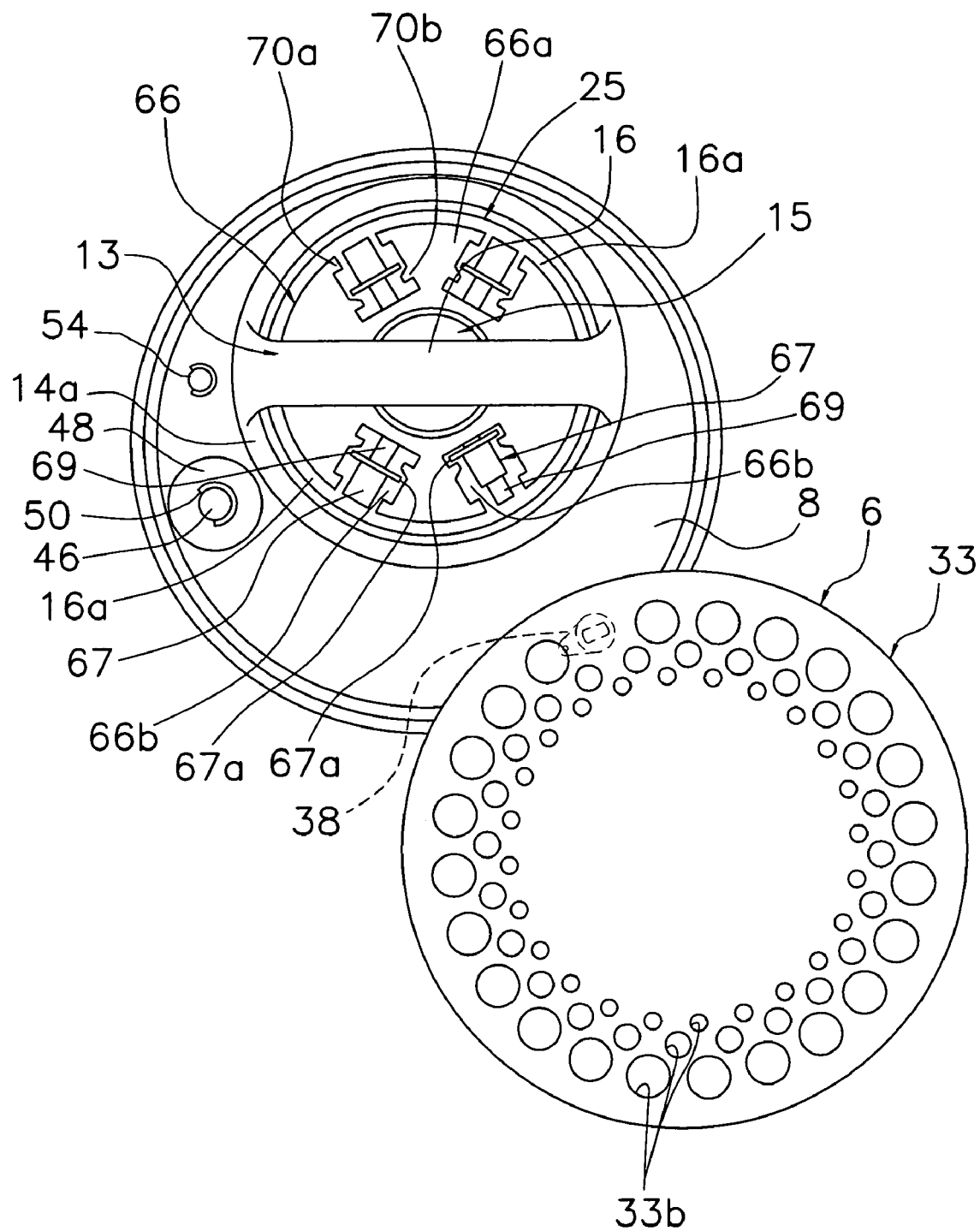
FIG. 6 is a left lateral view of the dual bearing reel illustrated in FIGS. 1-5 equipped with the spool assembly when a first side cover is opened in accordance with a first embodiment of the present invention.

As shown in FIGS. 1, 3 and 6, the spool support portion 13 includes a closed-end bearing 15, a convex handle portion 16 and a centrifugal braking mechanism 25. The convex handle portion 16 rotatively operates the spool support portion 13. The bearing 15 and the convex handle portion 16 are integrally formed. The bearing 15 and the convex handle portion 16 are made of a synthetic resin or metal. A first bearing 26*b* for rotatively supporting one end of the spool shaft 20 is provided on the inner peripheral surface of the bearing 15. In addition, the centrifugal braking mechanism 25 serves to control backlash when casting. The centrifugal braking mechanism 25 is disposed between the frame 5 and the first side cover 6.

The convex handle portion 16 is arranged so as to connect the brake member 68 with the bearing 15. The convex handle portion 16 is curved outward into a convex shape in the axial direction. The convex handle portion 16 includes an opening 16*a*. The side of the spool 12 is visible from the opening 16*a* and a fingertip can be inserted therein.

Figure 5:
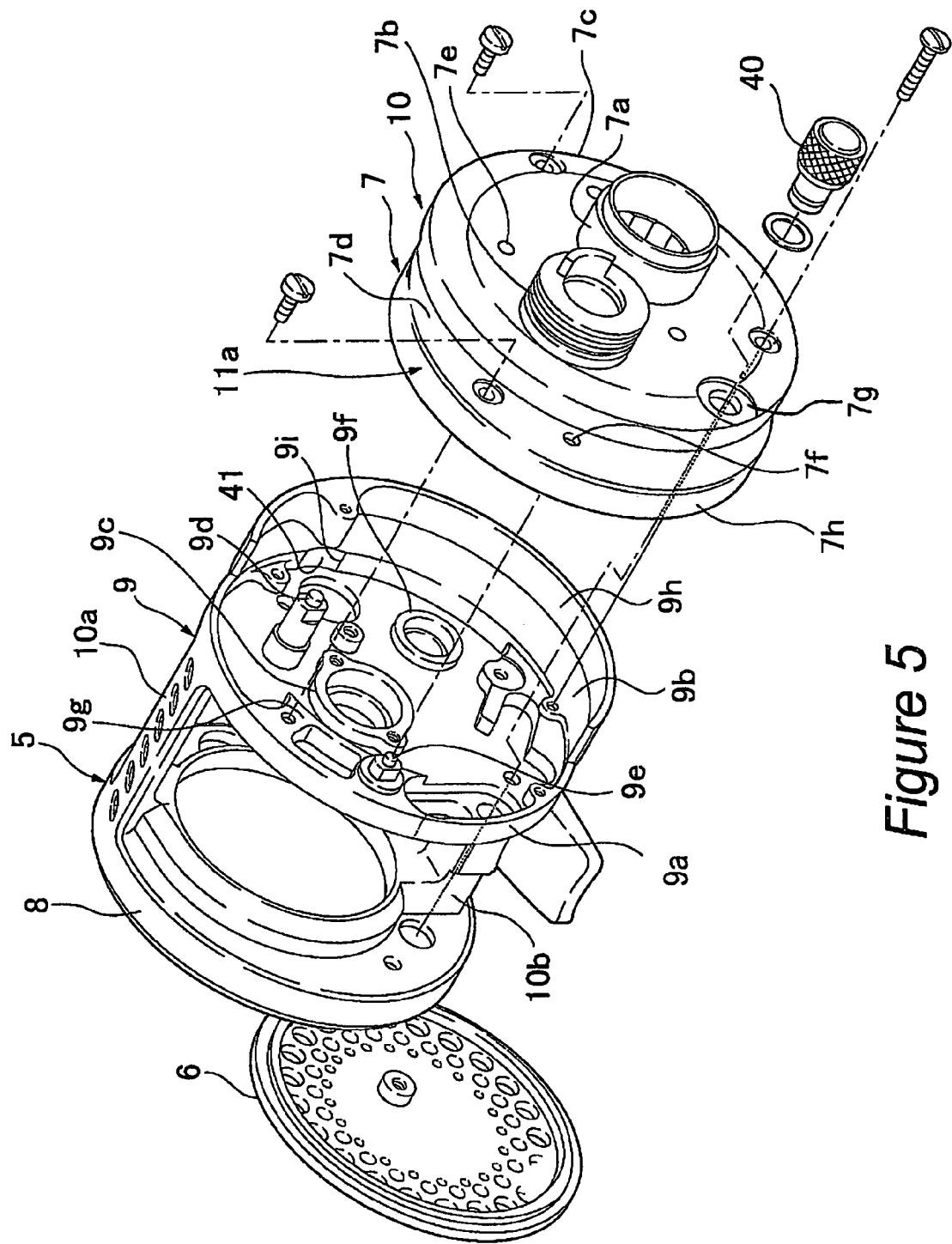
FIG. 5 is an exploded perspective view of a reel unit of the dual bearing reel illustrated in FIGS. 1-4 in accordance with a first embodiment of the present invention.

As shown in FIG. 5, the second side plate 9 includes a closed-end plate mounting portion 9*a*, a protruding portion 9*b*, a first plate boss 9*c*, first and second positioning pins 9*d* and 9*e*, a second plate boss 9*f*, a guide portion 9*g*, an edge portion 9*h* and a cut-out portion 9*i*. The plate mounting portion 9*a* is flat and cylindrical. The plate mounting portion 9*a* has the same diameter as the first side plate 8. The protruding portion 9*b* is formed eccentrically on the edge of the plate mounting portion 9*a* diagonally downward to the front, such that its outer rim intersects with the outer rim of the mounting portion 9*a*. The protruding portion 9*b* is formed as a crescent-shaped circular arc. The first plate boss 9*c* supports a pinion gear 32. The first plate boss 9*c* is formed in the bottom of the plate mounting portion 9*a*. The first and second positioning pins 9*d* and 9*e* are provided on opposite sides of the first plate boss 9*c*. The first and second positioning pins 9*d* and 9*e* are for positioning the second side cover 7. A small diameter head portion is formed on each tip of the first and second positioning pins 9*d* and 9*e*.

Furthermore, the second plate boss 9*f* supports a base end of the handle shaft 30. The second plate boss 9*f* is formed diagonally below and in front of the first plate boss 9*c*. The second plate boss 9*f* is formed at a portion where an outer periphery of the plate mounting portion 9*a* overlaps with an outer periphery of the protruding portion 9*b*. The guide portion 9*g* is slightly concave and arcuate. The guide portion 9*g* guides a component of the clutch control mechanism 22. The guide portion 9*g* is formed between the first plate boss 9*c* and the positioning pin 9*e*. The cut-out portion 9*i* extends from the front edge of the plate mounting portion 9*a* to the bottom portion of the protrusion portion 9*b*. The cut-out portion 9*i* is formed in order to secure a component of the level wind mechanism 18. On the protruding portion 9*b*, the edge portion 9*h* is curved in a circular arc shape. The edge portion 9*h* is formed along the outer edge of the crescent-shaped portion from the portion that points diagonally downward towards the front. The edge portion 9*h* is formed on the protruding portion 9*b* to the position where the two outer peripheral portions intersect.

Figure 8:
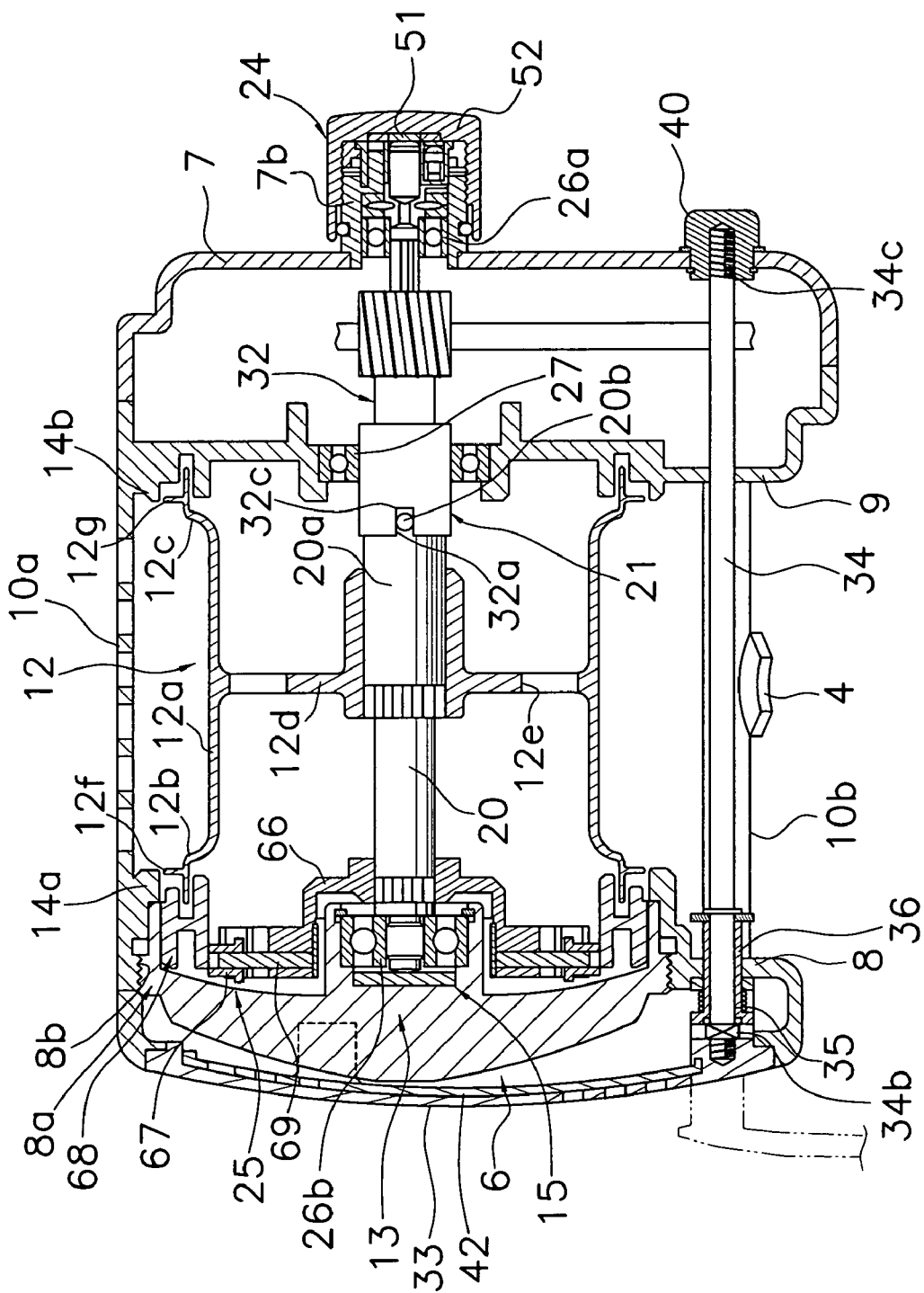
FIG. 8 is a cross-sectional view of the dual bearing reel illustrated in FIGS. 1-7 equipped with the spool assembly in accordance with a first embodiment of the present invention.
Figure 14:
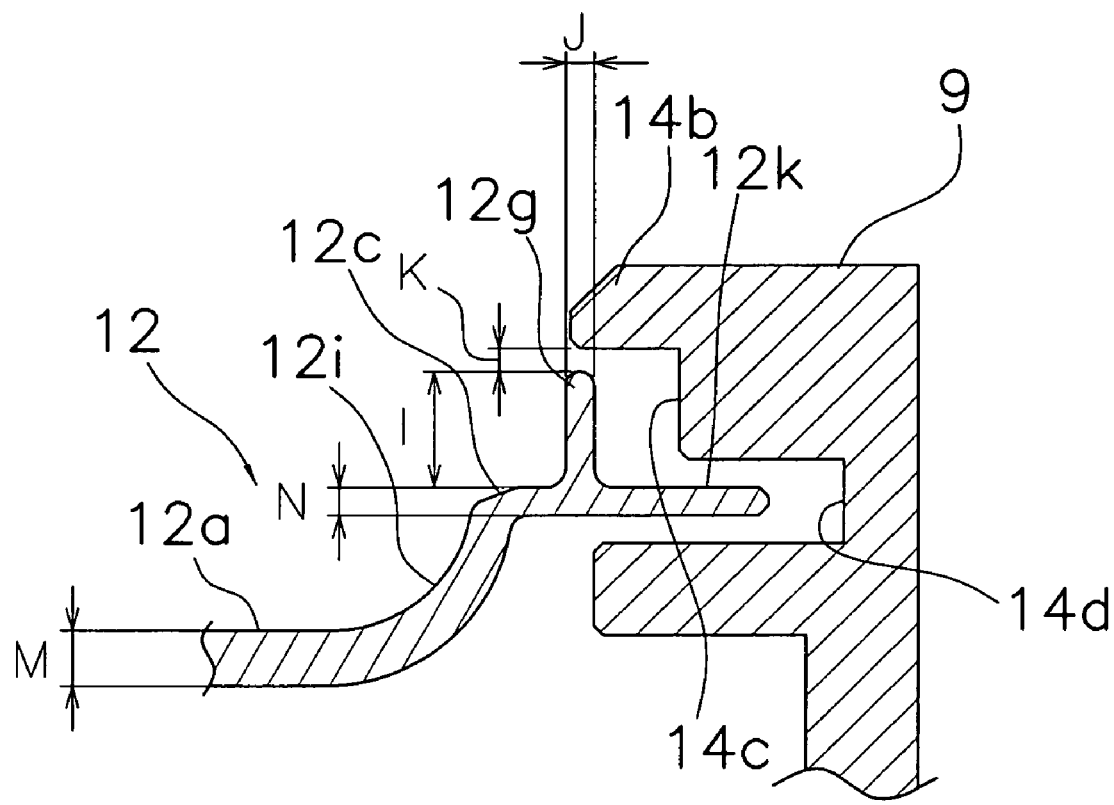
FIG. 14 is an enlarged cross-sectional view of the right side of the spool assembly and related components in accordance with a first embodiment of the present invention.

As shown in FIGS. 3 and 8, the ring shaped first and second annular portions 14*a* and 14*b* are formed on the first and second side plates 8 and 9, respectively. Both the first and second annular portions 14*a* and 14*b* project inwardly in the axial direction. On an inner peripheral portion of the first annular portion 14*a*, as shown in FIG. 13, a first tubular portion 68*d* of the brake member 68 is arranged so that an end surface is positioned further outward in the axial direction than the end surface of the first annular portion 14*a*. As shown in FIG. 14, a second tubular section 14*c* whose tip surface is arranged axially outward of the end surface of the second annular portion 14*b* is unitarily formed with the inner peripheral portion of the second annular portion 14*b*. A second annular groove 14*d* that opens laterally is formed in the second tubular portion 14*c*.

It will be apparent to one of skill in the art from this disclosure that a construction is also possible in which the second annular portion 14*b* and the second tubular portion 14*c* are arranged separately. In addition, a construction is also possible in which the second annular groove 14*d* is not provided in the second tubular portion 14*c*.

Figure 9:
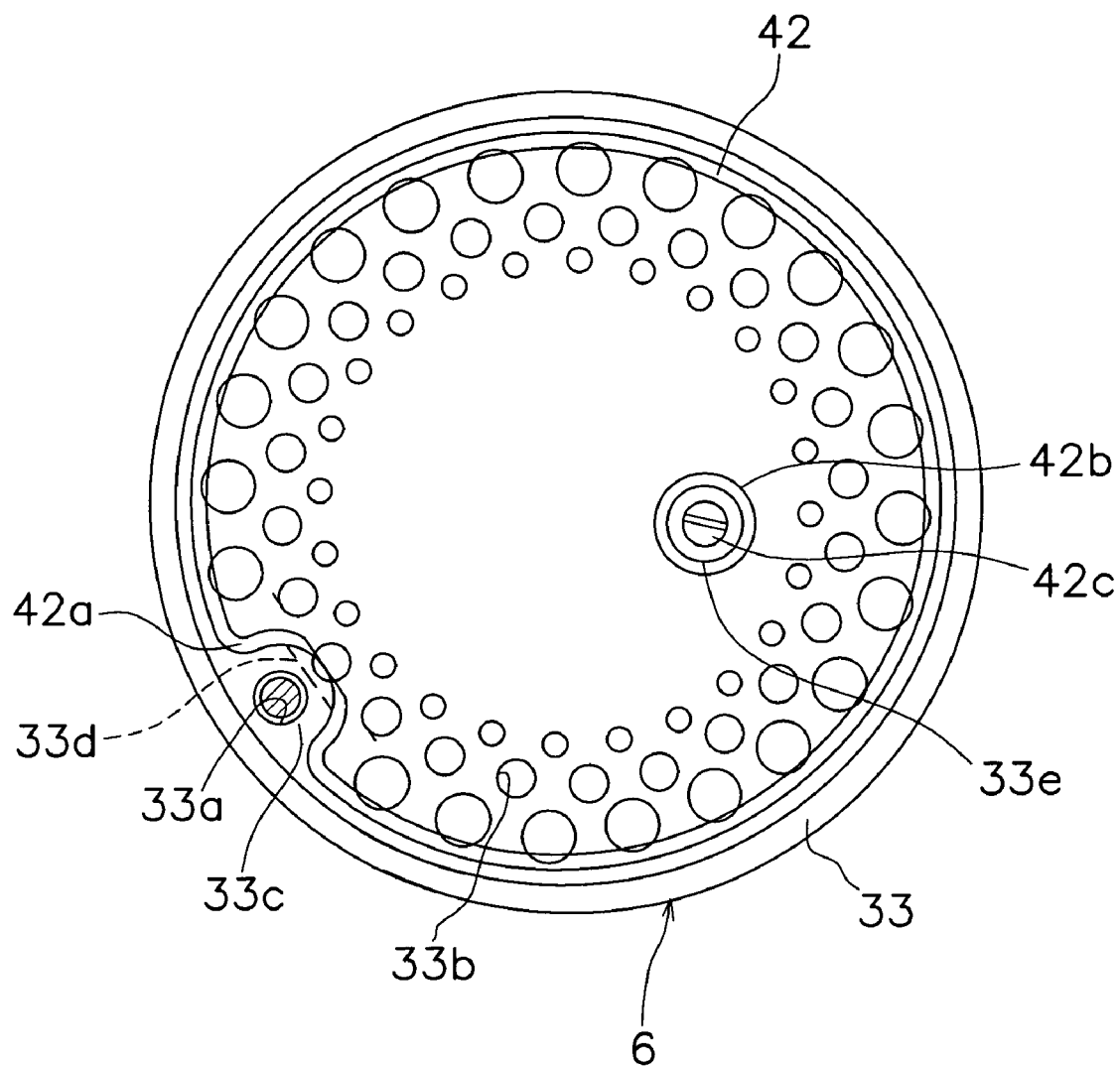
FIG. 9 is a front view of an inner side surface of the first side cover of the dual bearing reel illustrated in FIGS. 1-8 equipped with the spool assembly in accordance with a first embodiment of the present invention.

As shown in FIGS. 6, 8 and 9, the first side cover 6 is mounted pivotally to the first side plate 8. The first side cover 6 is able to be opened and closed with respect to the frame 5 to allow the spool 12 to be attached and detached. The first side cover 6 pivots from the closed position shown in FIGS. 3 and 4 to the open position shown in FIGS. 1, 5 and 6. The first side cover 6 includes a disk-shaped cover 33, a pivot shaft 34, a coil spring 35 and a pipe member 36, an O-ring 37, support member 38, a restriction disk 39 and an end nut 40. The disk-shaped cover 33 covers an outer side of the first side plate 8. The pivot shaft 34 pivotally supports the cover 33. The coil spring 35 urges the cover 33 away from the first side plate 8

Figure 10:
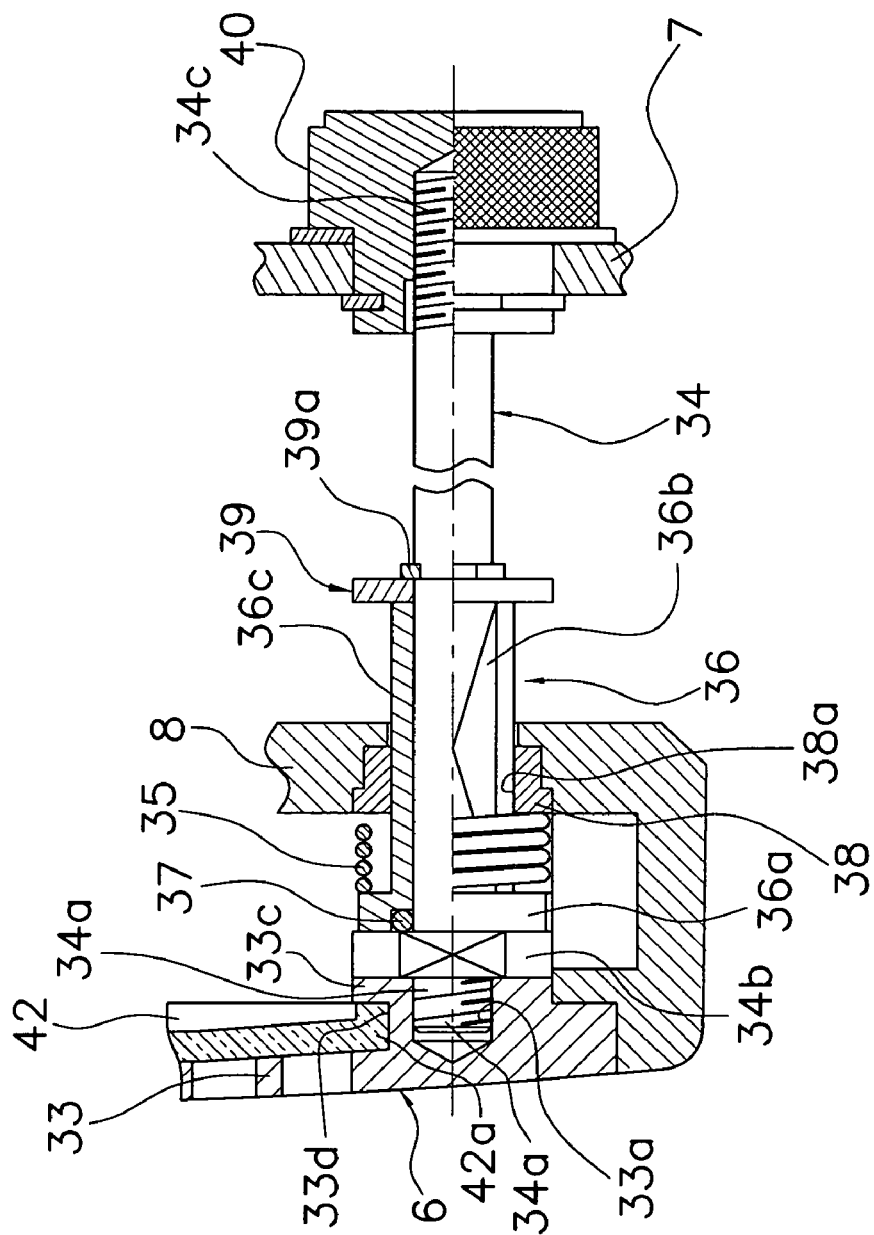
FIG. 10 is a magnified, partial cross-sectional view of the dual bearing reel in FIG. 8 equipped with the spool assembly in accordance with a first embodiment of the present invention.

Referring to FIGS. 9 and 10, the cover 33 is a metal member that is slightly curved outward in a convex shape so as to cover the first side plate 8. The cover 33 includes a screw hole 33a, a plurality of round holes 33b, a cover boss 33c, a cut-out engagement portion 33d and an attachment portion 33e. In order to enhance its appearance and to make it lighter, the round holes 33b of varying diameter are provided in the cover 33 and spaced apart in the circumferential direction. The round holes 33b are also radially spaced. The screw hole 33a for securing the pivot shaft 34 is formed on an inner surface of an outer peripheral side of the cover 33. Around the screw hole 33a, the cover boss 33c protrudes from an outer peripheral edge of the screw hole 33a toward the center. At a boundary with the cover boss 33c and the cover 33, the linearly cut-out engagement portion 33d is cut out approximately along the circumferential direction. In addition, the inwardly protruding attachment portion 33e is formed on the inner surface of the cover 33. The attachment portion 33e is slightly offset from the center of the cover 33. When the cover 33 is fitted to the first side plate 8, the attachment portion 33e is arranged at a position near the convex handle portion 16 of the spool support portion 13. Thus the spool support portion 13 will not rotate in the loosening direction because the cover 33, via handle portion 16, abuts against the spool support portion 13.

A sealing member 42 for preventing the intrusion of dirt or liquids through the round holes 33b is attached to the inner surface of the cover 33. The sealing member 42 is made of a synthetic resin, such as ABS (acrylonitrile butadiene styrene) resin. The sealing member 42 is translucent so that the interior is visible. As shown in FIG. 9, the sealing member 42 is curved outward in a convex shape in adaptation to the curve of the cover 33. An outer diameter of sealing member 42 follows the inner side of an edge of the cover 33. The sealing member 42 includes a recess 42a, a tubular portion 42b and a screw 42c. The recess 42a is formed on the portion of the sealing member 42 that runs along the cover boss 33c. The recess 42a engages with the engagement portion 33d. The tubular portion 42b covers the attachment portion 33e. The tubular portion 42b is provided on the inner surface of the sealing member 42. The screw 42c passes through the tubular portion 42b and is threaded into the attachment portion 33e. The sealing member 42 is fixed to the rear surface of the first side cover 6 by means of the recess 42a and the tubular portion 42b. That is, when attaching the sealing member 42 to the first side cover 6, the tubular portion 42b is slipped onto the attachment portion 33e after fitting the recess 42a against the engagement portion 33d. Then, the screw 42c is threaded into the attachment portion 33e to fix the sealing member 42 to the inner surface of the first side cover 6.

As shown in FIGS. 8 and 10, the pivot shaft 34 includes a first threaded portion 34a, a tool engagement portion 34b and a second threaded portion 34c. The first threaded portion 34a is threaded into the screw hole 33a. The first threaded portion 34a is formed on the tip of the pivot shaft 34. The tool engagement portion 34b has a large diameter and is formed adjacent to the first threaded portion 34a. The first threaded portion 34a is threaded into the cover 33, thereby fixing the pivot shaft 34 to the cover 33. The right end of the pivot shaft 34 is rotatably supported by the second side plate 9. The pivot shaft 34 protrudes outward beyond the second side cover 7.

The pipe member 36 passes through the first side plate 8. The pipe member 36 is arranged concentrically around an outer periphery of the pivot shaft 34. The tip of the pivot shaft 34 is rotatably supported by the pipe member 36. The pipe member 36 supports the pivot shaft 34 such that the pivot shaft 34 is rotatable and axially nonmovable. The pipe member 36 includes a large diameter portion 36a, a plurality of chamfered portions 36b and a small diameter portion 36c. The large diameter portion 36a is formed on the left end of the pipe member 36. The O-ring 37 is mounted inside the large diameter potion 36a.

The compressed coil spring 35 is mounted around the outer periphery of the pivot shaft 34 between the large diameter portion 36a and the first side plate 8. The chamfered portions 36b are parallel and are formed in an outer peripheral surface of the pipe member 36. More specifically, the chamfered portions 36b are formed in an outer peripheral surface of the small diameter portion 36c. The support member 38 has an oval hole 38a. The support member 38 is threaded to the first side plate 8. The oval hole 38a supports the chamfered portions 36b nonrotatably but movably in the axial direction. The restriction disk 39 is for restricting axial movement of the pivot shaft 34 and is fixed with a snap ring 39a to the base end of the pipe member 36. By retaining the pipe member 36 between the restriction disk 39 and the large diameter portion 36a, the pivot shaft 34 is supported so that it cannot move axially with respect to the pipe member 36. In addition, when the first side cover 6 is opened, the restriction disk 39 abuts against the first side plate 8, thus determining its axial position. Accordingly, the first side cover 6 is mounted on the first side plate 8 such that it can pivot and move in the axial direction over a predetermined distance. Thus, the side cover 6 is able to be opened and closed without falling off the first side plate 8.

The second threaded portion 34c is formed on the base end of the pivot shaft 34. The second threaded portion 34c is threaded into an attachable and detachable end nut 40. The end nut 40 is used for opening and closing the first side cover 6. The end nut 40 is rotatably mounted to the second side cover 7 but is immovable in the axial direction. When the threaded portion 34c is released from the end nut 40 by turning the end nut 40 counterclockwise, the pivot shaft 34 is urged by the coil spring 35 to the left in FIG. 8. At the same time, the cover 33 also moves to the left, and the first side cover 6 opens. When the first side cover 6 opens, it pivots due to its own weight. The pivoting speed is restricted to an appropriate speed with the O-ring 37.

The second side cover 7 includes a tubular first cover boss 7a, a tubular second cover boss 7b, a cover mounting portion 7c, a crescent-shaped projecting portion 7d, a first positioning hole 7e, a second positioning hole 7f, a knob hole 7g and a cover edge portion 7h. As shown in FIGS. 2-5, the second side cover 7 has a lateral surface shaped like two eccentric, intersecting circles that are the same as those of the second side plate 9. The second side cover 7 is fixed to the second side plate 9 with, for example, three screws. The cover mounting portion 7c is closed-ended and has the same diameter as the shape along the protruding portion 9b of the second side plate 9. The projecting portion 7d faces the plate mounting portion 9a of the second side plate 9. The projecting portion 7d is an arc that is eccentric to the diagonal rear upper edge of the cover mounting portion 7c. The first cover boss 7a supports the handle shaft 30. The second cover boss 7b supports the spool shaft 20. The first and second cover bosses 7a and 7b are fixed to an end portion of the cover mounting portion 7c in a spaced relationship and project outward. The first cover boss 7a is arranged coaxially with the second plate boss 9f formed on the second side plate 9. The second cover boss 7b is arranged coaxially with the first plate boss 9c. The first positioning hole 7e is for positioning the second side cover 7 and is formed on the front side of the second cover boss 7b. Furthermore, a knob hole 7g, which rotatively supports the end nut 40 is formed behind the first cover boss 7a.

The cover edge portion 7h is curved like a circular arc and is formed along the outer edge of the projecting portion 7d from a portion that points diagonally upward towards the rear. The cover edge portion 7h is arranged concentrically with the plate mounting portion 9a of the second side plate 9. The cover edge portion 7h is connected to the cover edge portion 9h of the protruding portion 9b so as to yield the shape of two eccentric flat disks lying on top of each other. The second positioning hole 7f is formed in the projecting portion 7d. The second cover boss 7b is disposed between the first and second positioning holes 7e and 7f. The second side plate 9 and the second side cover 7 are positioned by inserting the head portions of the first and second positioning pins 9d and 9e into the first and second positioning holes 7e and 7f, respectively. Accordingly, the bosses 9c, 7b, 9f and 7a are each centered and arranged coaxially.

As shown in FIGS. 3, 7 and 8, the spool 12 has a tubular bobbin 12a, a first flange portion 12b, a second flange portion 12c and a spool boss 12d. The first and second flange portions 12b and 12c are arranged to project radially outward on both ends of the bobbin 12a. The bobbin 12a is configured to hold fishing line around an outer periphery of the bobbin 12a. The spool boss 12d is unitarily formed with the bobbin 12a at a substantially central portion in the axial direction of an inner peripheral side of the bobbin 12a. The spool shaft 20 passes through the spool boss 12d. The spool 12 is nonrotatably fixed to the spool shaft 20. The spool 12 further includes a plurality of through holes 12e that are formed in both sides of the spool boss 12d. The through holes 12e are sized with large or small diameters and are arranged in two rows along the circumferential direction. The through holes 12e are arranged with equal spacing so that the large diameter holes are formed on the outer peripheral side and the small diameter holes are formed on the inner peripheral side of the spool boss 12d. By forming large and small diameter through holes 12e in this manner, the strength of the spool 12 can be maintained at a higher level than when through holes are formed in the bobbin 12a. Furthermore, the spool 12 is lightweight.

As shown in FIG. 12, the spool 12 further includes a first fishing line entry prevention portion 12f and a second fishing line entry prevention portion 12g. A slight gap is formed between a tip portion of the first annular portion 14a and the first fishing line entry prevention portion 12f and between the second annular portion 14b and the second fishing line entry prevention portion 12g. The first and second fishing line entry prevention portions 12f and 12g prevent fishing line from entering between the first flange portion 12b and the first side plate 8 and between the second side plate 9 and the second flange portion 12c.

As shown in FIG. 12, the first flange portion 12b has a first diagonal portion 12h and a first cylindrical portion 12j. The second flange portion 12c has a second diagonal portion 12i and a second cylindrical portion 12k. The first diagonal portion 12h gradually increases in diameter as it outwardly extends in the axial direction towards the left end of the bobbin 12a. The second diagonal portion 12i gradually increases in diameter as it outwardly extends in the axial direction towards the right end of the bobbin 12a. The first and second cylindrical portions 12j and 12k extend outwardly in the axial direction from an end of the first and second diagonal portions 12h and 12i, respectively. The first and second cylindrical portions 12j and 12k have the same diameter.

Referring to FIGS. 12-14, the first cylindrical portion 12j is covered by an inner periphery of the first annular portion 14a, which extends above the cylindrical portion 12j. The second cylindrical portion 12k is covered by an inner periphery of the second annular portion 14b, which extends above the cylindrical portion 12k. At least a portion of the second flange portion 12c is in the second annular groove 14d. Preferably, the second cylindrical portion 12k of the second flange portion 12c is in the second annular groove 14d. The first fishing line entry prevention portion 12f projects upward from an outer periphery of the first cylindrical portion 12j. The second fishing line entry prevention portion 12g projects upward from an outer periphery of the second cylindrical portion 12k. More specifically, the first and second fishing line entry prevention portions 12f and 12g are arranged so as to be substantially perpendicular to the outer peripheral surfaces of the first cylindrical portion 12j and the second cylindrical portion 12k, respectively.

As shown in FIGS. 13 and 14, the first fishing line entry prevention portion 12f is arranged across a first gap from the first tip portion of the first annular portion 14a. The second fishing line entry prevention portion 12g is arranged across a second gap from the second tip portion of the second annular portion 14b.

Figure 15:
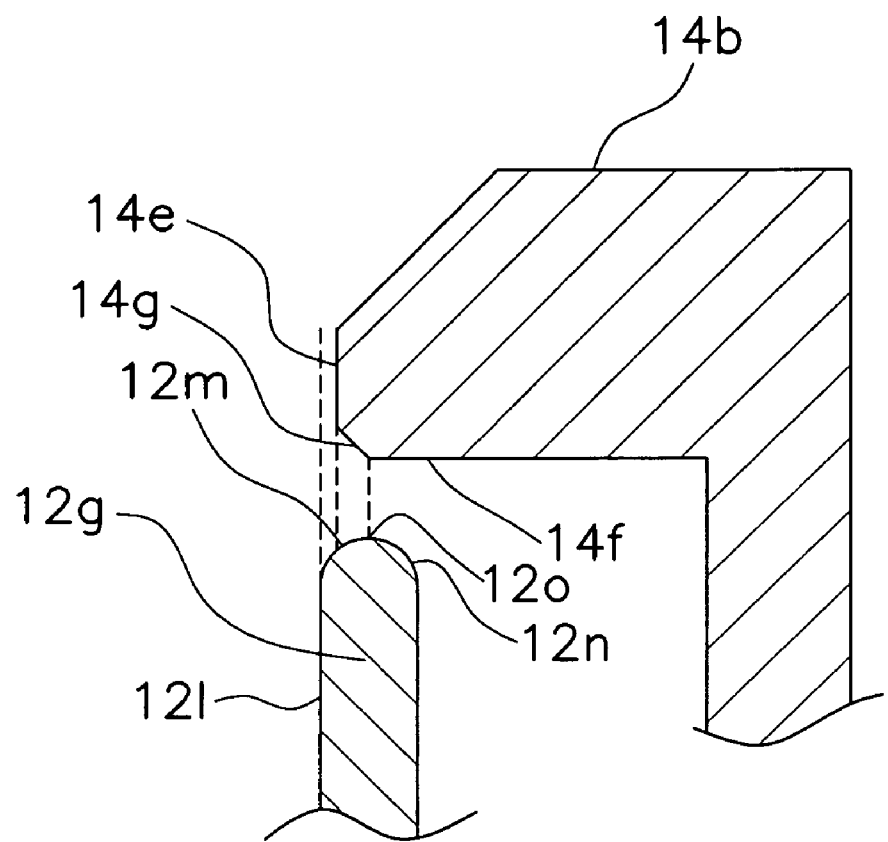
FIG. 15 is an enlarged partial cross-sectional view of a second fishing line entry prevention portion and a second annular portion of the spool assembly in accordance with a first embodiment of the present invention.

As shown in FIG. 13, the first fishing line entry prevention portion 12f is arranged so that a lateral surface on the right or bobbin side of the first fishing line entry prevention portion 12f is positioned more axially inward than a tip surface of the first annular portion 14a. Referring to FIGS. 14 and 15, the tip portion of the second annular portion 14b has a tip surface 14e. The second fishing line entry prevention portion 12g is arranged so that a lateral surface on the left or bobbin side of the second fishing line entry prevention portion 12g is positioned more axially inward than the tip portion of the second annular portion 14b. As shown in FIG. 15, the second fishing line entry prevention portion 12g is arranged so that the lateral surface 121 of the bobbin 12a side is positioned more inward in the axial direction than the tip portion of the second annular portion 14b. The second fishing line entry prevention portion 12g has a top portion that is in a tapered shape. The tapered top portion of the second fishing line entry prevention portion 12g faces the inner peripheral surface 14f of the second annular portion 14b. Specifically, the tapered top portion of the second fishing line entry prevention portion 12g has a first diagonal surface 12m, a second diagonal surface 12n and an outermost portion 12o. The first and second diagonal surfaces 12m and 12n are respectively slanted in opposing axial directions. In addition, the second annular portion 14b has a tapered portion 14g that increases in diameter from the inner peripheral surface 14f to the tip surface 14e. The tapered portion 14g is formed so that an edge on the inner peripheral surface 14f side is approximately aligned with the outermost portion 12o of the second fishing line entry prevention portion 12g. The structural arrangement of the first fishing line entry prevention portion 12f, for purposes of alignment with first annular portion 14a, is the mirror image of the second fishing line entry prevention portion 12g shown in FIG. 15.

It will be apparent to one of skill in the art from this disclosure that a construction which does not have the tapered portions 14g is also possible.

As shown in FIG. 12, the spool 12 is a shallow channel spool having a small space for winding fishing line. The bobbin 12a has an outer diameter A between about 20 and 28.5 mm. A maximum line winding diameter D of the first flange portion 12b and the second flange portion 12c is between about 25 and 30 mm. The outer diameter A of the bobbin 12a is formed so as to be between about 80% to 95% of the maximum line winding diameter D of the first flange portion 12b and the second flange portion 12c. More specifically, the outer diameter A of the bobbin 12a is preferably about 24 mm. The maximum line winding diameter D of the first flange portion 12b and the second flange portion 12c is preferably about 27.1 mm. The outer diameter A of the bobbin 12a is preferably about 89% of the maximum line winding diameter D of the first flange portion 12b and the second flange portion 12c.

An outermost prevention portion diameter C of the first fishing line entry prevention portion 12f and the second fishing line entry prevention portion 12g is shown in FIG. 12. The outermost prevention portion diameter C is formed to be between about 105% and 115% of the maximum line winding diameter D of first flange portion 12b and the second flange portion 12c. In addition, as shown in FIGS. 13 and 14, a projection height I of the first fishing line entry prevention portion 12f and the second fishing line entry prevention portion 12g is between about 2.5% and 7.5% of the maximum line winding diameter D of the first flange portion 12b and the second flange portion 12c. In addition, the outermost prevention portion diameter C of the first fishing line entry prevention portion 12f and the second fishing line entry prevention portion 12g is between about 27 mm and 34 mm. The projection height I of the first fishing line entry prevention portion 12f and the second fishing line entry prevention portion 12g is between about 1.0 mm and 2.0 mm. More specifically, the outermost prevention portion diameter C of the first fishing line entry prevention portion 12f and the second fishing line entry prevention portion 12g is preferably about 29.6 mm. The projection height I of the first fishing line entry prevention portion 12f and the second fishing line entry prevention portion 12g is preferably about 1.25 mm. The outermost prevention portion diameter C of the first fishing line entry prevention portion 12f and the second fishing line entry prevention portion 12g is preferably about 109% of the maximum line winding diameter D of the first flange portion 12b and the second flange portion 12c. The projection height I of the first fishing line entry prevention portion 12f and the second fishing line entry prevention portion 12g is preferably about 4.6% of the maximum line winding diameter D of the first flange portion 12b and the second flange portion 12c.

As shown in FIG. 12, the inner diameter B of the first annular portion 14a and the second annular portion 14b is between about 28 mm and 35 mm. More specifically, the inner diameter B is preferably about 30.1 mm. Because of the size of the outermost prevention portion diameter C, a gap K is created. As shown in FIGS. 13 and 14, the gap K is between the first fishing line entry prevention portion 12f and the first annular portion 14a and between the second fishing line entry prevention portion 12g and the second annular portion 14b. The gap K is between about 0.1 mm and 0.5 mm. More specifically, the gap K is preferably about 0.25 mm.

The first fishing line entry prevention portion 12f and the second fishing line entry prevention portion 12g are formed at a prevention portion thickness J. The prevention portion thickness J is between about 0.1 mm and 0.5 mm. More specifically, the prevention portion thickness J is preferably about 0.3 mm. A bobbin thickness M of the bobbin 12a is preferably about 0.6 mm. A flange thickness N of the first flange portion 12b and the second flange portion 12c is preferably about 0.3 mm. More preferably, the prevention portion thickness J of the first fishing line entry prevention portion 12f and the second fishing line entry prevention portion 12g is smaller than the bobbin thickness M of the bobbin 12a.

As shown in FIGS. 3 and 8, the spool shaft 20 passes through the second side plate 9 and extends outward of the second side cover 7. An end of the spool shaft 20 that extends beyond the second side cover 7 is rotatively supported on the boss 7b by means of the first bearing 26a. In addition, the other end of the spool shaft 20 is rotatively supported by means of the second bearing 26b as described above.

The right end of the large diameter portion 20a of the spool shaft 20 is arranged at a pass-through portion of the second side plate 9. An engaging pin 20b which is part of the clutch mechanism 21 passes through the large diameter portion 20a along the diameter. Both ends of the engaging pin 20b project in the radial direction.

As shown in FIGS. 1 and 3, a clutch lever 17 is arranged to the rear of the spool 12 between the first side plate 8 and the second side plate 9. The clutch lever 17 slides between the first side plate 8 and the second side plate 9. The clutch lever 17 includes an engagement shaft 17a, which is unitarily formed with the clutch lever 17. The engagement shaft 17a is located on the side of the clutch lever 17 where the handle 2 is mounted. The engagement shaft 17a passes through the second side plate 9. The engagement shaft 17a is engaged with the clutch control mechanism 22.

Figure 11:
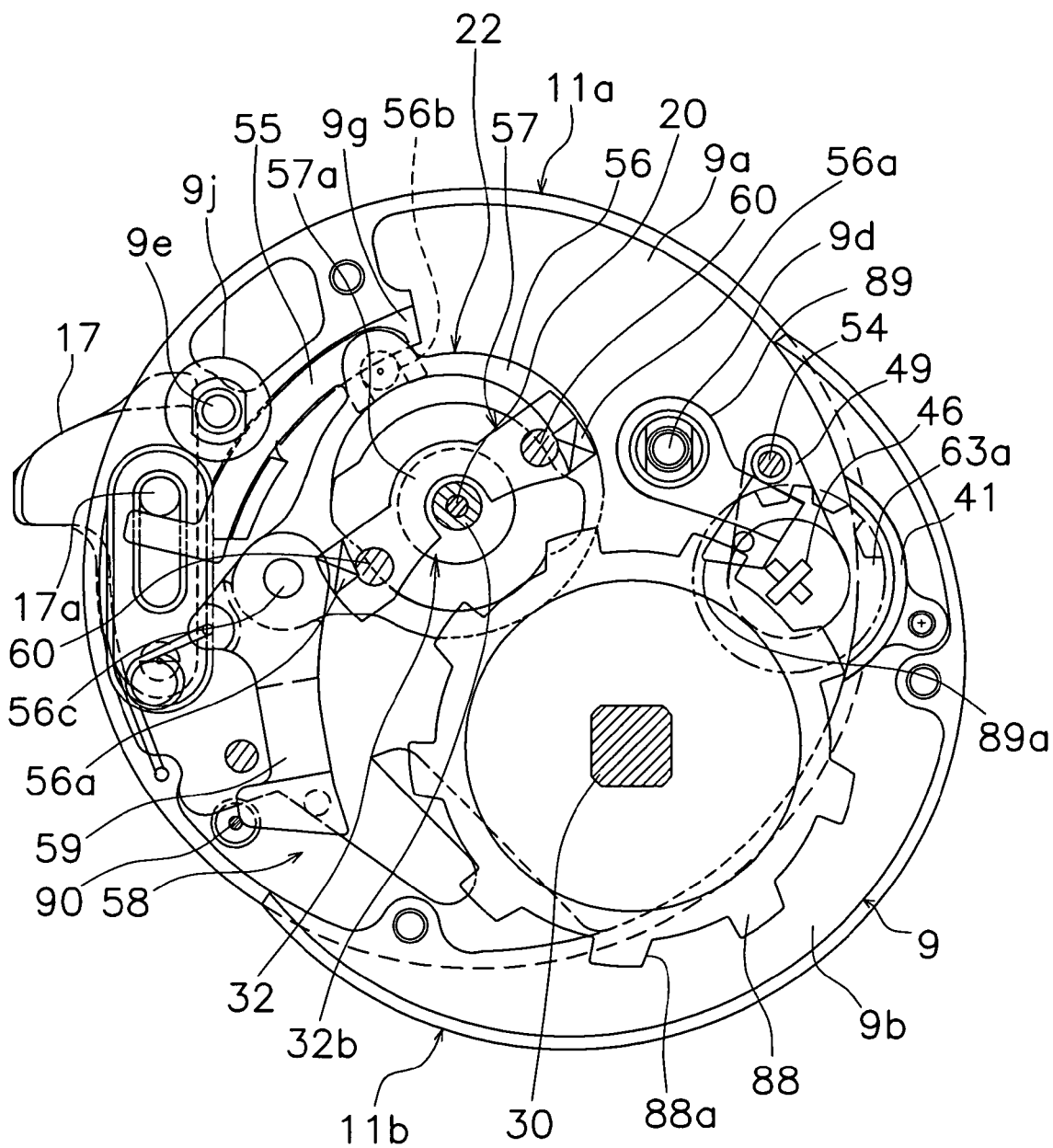
FIG. 11 is a cross-sectional view of the dual bearing reel illustrated in FIGS. 1-9 equipped with the spool assembly with a second side cover that is opened in accordance with a first embodiment of the present invention.

As shown in FIGS. 3 and 7, the level wind mechanism 18 is arranged between the first side plate 8 and the second side plate 9 in front of the spool 12. The level wind mechanism 18 includes a worm shaft 46, a fishing line guide portion 47, first and second shaft support portions 48 and 49 and first and second gear members 63a and 63b. The fishing line guide portion 47 is reciprocally moved by the worm shaft 46 in the spool shaft direction. Intersecting helical grooves 46a are formed on an outer peripheral surface of the worm shaft 46. The two ends of the worm shaft 46 are rotatively supported by the first and second shaft support portions 48 and 49. The first and second shaft support portions 48 and 49 are mounted on the first side plate 8 and the second side plate 9, respectively. In FIG. 3, the left end of the worm shaft 46 is retained by an E-shaped retaining ring 50. The first gear member 63a is mounted on the right end of the worm shaft 46 in FIG. 3. In order to cover the cut-out portion 9i, a cover member 41 that is curved into a circular arc shape is detachably mounted along the outer edge of the first gear member 63a. Referring to FIGS. 5 and 11, the first gear member 63a meshes with the second gear member 63b that is mounted non-rotatively to the handle shaft 30. With this configuration, the worm shaft 46 rotates in association with the rotation of the handle shaft 30 in the fishing line winding direction.

As shown in FIG. 7, the fishing line guide portion 47 is arranged around the worm shaft 46. The fishing line guide portion 47 is guided in the direction of the spool shaft 20 by a pipe member 53. A portion of the pipe member 53 is cut away over the entire axial length of the pipe member 53. A guide shaft 54 that is arranged above the worm shaft 46. The fishing line guide portion 47 includes an engagement member 47a and a guide ring 47b. The engagement member 47a, which engages with the helical grooves 46a, is rotatably mounted on the fishing line guide portion 47. The engagement member 47a is reciprocally moved in the spool shaft direction by the rotation of the worm shaft 46. The oval guide ring 47b, through which the fishing line is passed, is mounted on an upper portion of the fishing line guide portion 47. The guide ring 47b is made of a hard ceramic material, such as SiC, for example.

The pipe member 53 engages with the first and second shaft support portions 48 and 49. The guide shaft 54 is fixed to the first side plate 8 and the second side plate 9. An end portion of the guide shaft 54 projects through the second side plate 9 toward the second side cover 7. As shown in FIG. 11, the second shaft support portion 49 is substantially teardrop shaped. The second shaft support portion 49 rotatably supports the worm shaft 46 at a large diameter portion of the teardrop shape. The guide shaft 54 passes through a small diameter portion of the teardrop shape to prevent the second shaft support portion 49 from rotating.

As shown in FIG. 3, the gear mechanism 19 includes a handle shaft 30, a main gear 31, a tubular pinion gear 32, a roller type one-way clutch 86 and a pawl type one-way clutch 87. The main gear 31 is rotatably fixed to the handle shaft 30 via the drag mechanism 23. The pinion gear 32 meshes with the main gear 31. The handle shaft 30 is rotatably supported by the second plate boss 9f and the first cover boss 7a. The roller type one-way clutch 86 and the pawl type one-way clutch 87 prevent the handle shaft 30 from rotating in the line release direction (reverse rotation).

The roller type one-way clutch 86 is mounted between the first cover boss 7a and the handle shaft 30. As shown in FIG. 11, the pawl type one-way clutch 87 includes a ratchet gear 88 and a ratchet pawl 89. The ratchet gear 88 is nonrotatably mounted to the handle shaft 30 between the main gear 31 and the gear member 63b. The ratchet pawl 89 pivots around the positioning pin 9d. The ratchet gear 88 includes a plurality of ratchet teeth 88a. The ratchet teeth 88a are substantially parallelogram shaped. The ratchet teeth 88a are arranged in a spaced relationship in the circumferential direction on the outer periphery of the ratchet gear 88. The ratchet pawl 89 prevents the handle shaft 30 from rotating in the line winding direction by engaging the ratchet teeth 88a. The tip of the ratchet pawl 89 has a plurality of control pieces 89a that flank the ratchet gear 88 on both sides. The control pieces 89a cause the ratchet pawl 89 to near the ratchet gear 88 during rotation in the line winding direction. The control pieces 89a cause the ratchet pawl 89 to separate from the ratchet gear 88 during rotation in the line release direction. The guide shaft 54 contacts the ratchet pawl 89 during separation from the ratchet gear 88. Furthermore, the guide shaft 54 prevents the ratchet pawl 89 from separating from the ratchet gear 88 at too great of a distance.

As shown in FIG. 3, the pinion gear 32 extends from outside of the second side plate 9 to the inside thereof. The pinion gear 32 is a tubular member. The spool shaft 20 passes through the center of the pinion gear 32. The pinion gear 32 is mounted on the spool shaft 20 so as to be movable in the axial direction. The left end side of the pinion gear 32 in FIG. 3 is rotatably and movably supported on the second side plate 9 by a bearing 27. The pinion gear 32 includes a meshing groove 32a, a constricted portion 32b and a gear portion 32c. The meshing groove 32a meshes with the engaging pin 20b as shown in FIG. 8. The meshing groove 32a is formed on the left end of the pinion gear 32 in FIG. 3. The meshing groove 32a and the engaging pin 20b form the clutch mechanism 21. In addition, the constricted portion 32b is formed in a central portion of the pinion gear 32. The gear portion 32c meshes with the main gear 31. The gear portion 32c is formed on the right end of the pinion gear 32.

As shown in FIG. 11, the clutch control mechanism 22 has a clutch plate 55, a clutch cam 56 and a clutch yoke 57. The clutch plate 55 is engaged with the engagement shaft 17a. The clutch cam 56 is engaged with the clutch plate 55 and rotates around the spool shaft 20. The clutch cam 56 moves the clutch yoke 57 in the direction of the spool shaft 20. The clutch control mechanism 22 also has a clutch return mechanism 58, which causes the clutch mechanism 21 to be placed in the clutch on state in association with rotation of the spool 12 in the fishing line winding direction.

The clutch plate 55 is a plate-shaped member formed into a fan shape. The guide portion 9g of the second side plate 9 guides the clutch plate 55 in the rotational direction. The clutch plate 55 has a gap formed between the guide portion 9g by a collar 9j formed on the positioning pin 9e. The clutch plate 55 is thereby prevented from floating upward. One end of the clutch plate 55 extends to a position where it contacts the lower end of the engagement shaft 17a of the clutch lever 17 so that the clutch plate 55 moves counterclockwise in FIG. 11 in association with the downward movement of the clutch lever 17. The other end of the clutch plate 55 engages with the clutch cam 56. The clutch plate 55 and the clutch cam 56 rotate together around the spool shaft 20.

Referring to FIG. 11, the clutch cam 56 is a plate member that is approximately ring-shaped. The clutch cam 56 is mounted rotatively around the spool shaft 20 in the first plate boss 9c. The clutch cam 56 includes a pair of slanted cam protrusions 56a, an engagement pin 56b and a coupling portion 56c. The pair of slanted cam protrusions 56a is formed to flank the spool shaft 20 in positions that face the outer lateral surface of the clutch cam 56. The engagement pin 56b engages with the clutch plate 55. The engagement pin 56b is formed on the outer peripheral portion of the clutch cam 56. Furthermore, the coupling portion 56c is formed on the outer peripheral portion of the clutch cam 56. The coupling portion 56c is for coupling with a return pawl 59 that is part of the clutch return mechanism 58

The clutch yoke 57 is arranged to face the clutch cam 56 outward in the axial direction. The clutch yoke 57 is movable in the direction of the spool shaft 20. The clutch yoke 57 is guided by two upright guide shafts 60 which are provided between the second side plate 9 and the second side cover 7. The guide shafts 60 flank the spool shaft 20. The clutch yoke 57 is urged inward in the axial direction by compressed coil springs 61, as is illustrated in FIG. 3. The coil springs 61 are provided around the guide shafts 60 between the second side cover 7 and the clutch yoke 57. The clutch yoke 57 includes a semi-circular arc shaped engagement portion 57a. The engagement portion 57a engages with the constricted portion 32b of the pinion gear 32. On a side surface that faces the clutch cam 56, the clutch yoke 57 is provided with slanted surfaces (not shown) that rest on the cam protrusions 56a. When the clutch cam 56 is turned counterclockwise as viewed in FIG. 11, the cam protrusions 56a lift the slanted surfaces and the clutch yoke 57 is moved to a clutch-off position on the right in FIG. 3. When the slanted surfaces are lowered from the cam protrusions 56a the clutch yoke 57 is urged back into the clutch-on position by the coil springs 61. The pinion gear 32 shifts in the axial direction of the spool 12 in cooperation with the movement of the clutch yoke 57. The clutch yoke 57 switches the clutch mechanism 21 between the clutch-off state and the clutch-on state.

The clutch return mechanism 58 has a return pawl 59 and a toggle spring 62. The return pawl 59 is rotatably coupled to the coupling portion 56c of the clutch cam 56. The toggle spring 62 urges the return pawl 59. The return pawl 59 is guided by the second side plate 9 by the rotation of the clutch yoke 57. The return pawl 59 moves between a position where it contacts the ratchet teeth 88a of the ratchet gear 88 and a position where it is separated from the ratchet teeth 88a. The toggle spring 62 maintains the return pawl 59 in these two positions. As shown in FIG. 11, a guide shaft 90 that can contact with the tip portion of the return pawl 59 when the return pawl 59 is separated is provided on the second side plate 9. By providing this guide shaft 90, the tip portion of the return pawl 59 can prevent contact and abrasion with the guide portion of the second side plate 9.

When the clutch mechanism 21 is placed into the clutch-off state by pressing the clutch lever 17, the return pawl 59 is guided by the second side plate 9 and proceeds to contact the ratchet teeth 88a. When the handle shaft 30 is rotated in the fishing line winding direction by operation of the handle 2, the return pawl 59 is pressed by the ratchet teeth 88a to a separated position. The clutch cam 56 then rotates clockwise (as viewed in FIG. 11) and the clutch mechanism 21 returns to the clutch-on state.

The casting control mechanism 24 includes a plurality of friction plates 51 and a brake cap 52. The friction plates 51 are arranged so as to sandwich both ends of the spool shaft 20. The brake cap 52 adjusts a force that presses the friction plates 51 against the spool shaft 20. The left friction plate 51 is mounted inside the spool support portion 13.

As shown in FIGS. 3, 6, 8 and 12, the centrifugal braking mechanism 25 includes a rotation member 66, a plurality of tubular moving members 67 and a brake member 68. The rotation member 66 is fixed to the spool shaft 20 so that it rotates together with the spool 12. The moving members 67 are arranged on the rotation member 66 in a spaced relationship in the circumferential direction and are movable in the radial direction. The brake member 68 is fixed to the inner peripheral surface of the opening 8a. The brake member 68 is brought into contact with the moving members 67.

The rotation member 66 has a circular plate 66a and six recesses 66b, for example. The circular plate 66a is arranged on the outer peripheral side of the bearing 15. The six recesses 66b are formed in the circular plate 66a and are spaced apart at intervals in the circumferential direction. Each recess 66b has a pair of first and second engagement projections 70a and 70b. The first and second engagement projections 70a and 70b are formed in each recess 66b in a spaced relationship in the radial direction. The first engagement projections 70a are formed to project towards one another on the outer peripheral portion. The first engagement projections 70a serve to prevent the moving members 67 from falling off. The second engagement projections 70b are formed more to the inner peripheral side than the first engagement projections 70a. The second engagement projections 70b serve to prevent the moving members 67 from contacting the brake member 68. Each recess 66b also has a guide shaft 69 that extends in the radial direction. Each guide shaft 69 is arranged on the bottom surface of the recess 66b. The guide shafts 69 guide movement of the moving members 67.

The moving members 67 are tubular members. Each moving member 67 has a collar 67a on the end portion on the inner peripheral side that engages with the first and second engagement projections 70a and 70b. The diameter of the collars 67a is larger than that of the other portions. When the spool 12 rotates, centrifugal force acts on the moving members 67 and brings the moving members 67 into contact with the brake member 68, thereby braking the spool 12. The collars 67a are arranged on an inner peripheral side beyond the second engagement projections 70b. The collars 67a will come into contact with the second engagement projections 70b even when centrifugal force is applied and cannot be brought into contact with the brake member 68. The braking force of the centrifugal braking mechanism 25 can then be adjusted by switching the radial positions of the moving members 67.

As shown in FIG. 13, the brake member 68 has an outer tubular portion 68a, an inner tubular portion 68b and a male threaded portion 68c. The inner tubular portion 68b is press fitted onto the inner periphery of the outer tubular portion 68a. The male threaded portion 68c is formed on the outer tubular portion 68a. The male threaded portion 68c engages with the female threaded portion 8b formed on the inner peripheral portion of the opening 8a of the first side plate 8. The inner tubular portion 68b has a first tubular section 68d. A tip surface of the first tubular section 68d is positioned farther axially outward than the tip surface of the first annular portion 14a. The first tubular section 68d includes a first annular groove 68f and a reduced thickness portion 68g. The first annular groove 68f has a side portion on the spool 12 side (the right side of FIG. 13) that is open. The annular reduced thickness portion 68g has a side portion on the side opposite the first annular groove 68f (the left side of FIG. 13) that is open. The first tubular section 68d is arranged in a position in which the tip surface thereof faces the side surface of the first fishing line entry prevention portion 12f. The first annular groove 68f opens laterally and is formed in the first tubular section 68d. At least a portion of the first flange portion 12b is in the first annular groove 68f. Preferably, the first cylindrical portion 12j of the first flange portion 12b is in the first annular groove 68f. The brake member 68 functions as a centrifugal braking mechanism 25. The centrifugal braking mechanism 25 functions in order to make it difficult for fishing line to enter the interior of the reel unit 1.

It will be apparent to one of skill in the art from this disclosure that the outer tubular portion 68a and the inner tubular portion 68b may be formed unitarily. In addition, a construction is also possible in which at least either the first annular groove 68f or the reduced thickness portion 68g is not provided on the first tubular portion 68d.

Next, the operation and movement of the reel unit 1 during fishing will be described in detail.

When casting, the clutch lever 17 is pushed down. This moves the clutch plate 55 counterclockwise (as viewed in FIG. 11). At this point, the clutch plate 55 moves inside the guide portion 9g in a state in which it is prevented from floating upward by the positioning pin 9e. When the clutch plate 55 moves, the clutch cam 56 rotates counterclockwise and the clutch yoke 57 moves outward in FIG. 3 to the clutch-off position. As a result, the pinion gear 32 of the clutch mechanism 21 moves axially outward to the clutch-off state. In the clutch-off state, the spool 12 rotates freely. The fishing line will then unwind from the spool 12 at full speed when casting due to the weight of the tackle.

Referring to FIG. 11, when the tackle hits the water, the handle 2 is rotated in the fishing line winding direction. This causes the ratchet gear 88 to rotate in the fishing line winding direction and the ratchet pawl 89 to pivot around the positioning pin 9*d* away from the ratchet gear 88 due to the function of the control piece 89*a* and contact the guide shaft 54. As a result, the ratchet pawl 89 will not contact the ratchet gear 88 during fishing line winding. The clicking sound caused by the contact between the ratchet gear 88 and the control piece 89*a* during fishing line winding will not occur. In addition, when the ratchet gear 88 rotates in the line winding direction, the ratchet teeth 88*a* contact with the tip of the return pawl 59. The rotation of the ratchet gear 88 pushes the return pawl 59 rearward. The return pawl 59 will retreat beyond the dead point of the toggle spring 62. The return pawl 59 is urged by the toggle spring 62 into a separated position. The clutch cam 56 will rotate clockwise in FIG. 11 in association with this movement. The spring force of the coil springs 61 will move the clutch yoke 57 into the clutch-on position, and place the clutch mechanism 21 into the clutch-on state. Because of this, the rotation of the handle 2 will be transmitted to the spool 12, and the spool 12 will rotate in the fishing line winding direction.

Referring to FIG. 3, when the handle shaft 30 rotates in the line winding direction, this rotation is transmitted via the first and second gear members 63*a* and 63*b* to the worm shaft 46. When the worm shaft 46 rotates, the fishing line guide portion 47 will move reciprocally in the axial spool shaft direction so that the fishing line is taken up uniformly by the spool 12.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

In the aforementioned embodiment, a round-type dual bearing reel was used as an example, but the shape of the dual bearing reel is not limited to this. The present invention can also be applied to different types of dual bearing reels, e.g., a low profile type. In addition, the present invention is not limited to small dual bearing reels having a shallow channel spool, and may be applied to dual bearing reels having large dual bearing reels or dual bearing reels having a deep channel spool.

In the aforementioned embodiment, the maximum line winding diameter D of the first flange portion 12*b* and the second flange portion 12*c* was used as a reference to determine each dimension of the spool 12. However, in the event that the maximum line winding diameter D of the first flange portion 12*b* and the second flange portion 12*c* are different, the maximum line winding diameter D may be used as a reference to determine the dimensions.

Second Embodiment

Figure 16:
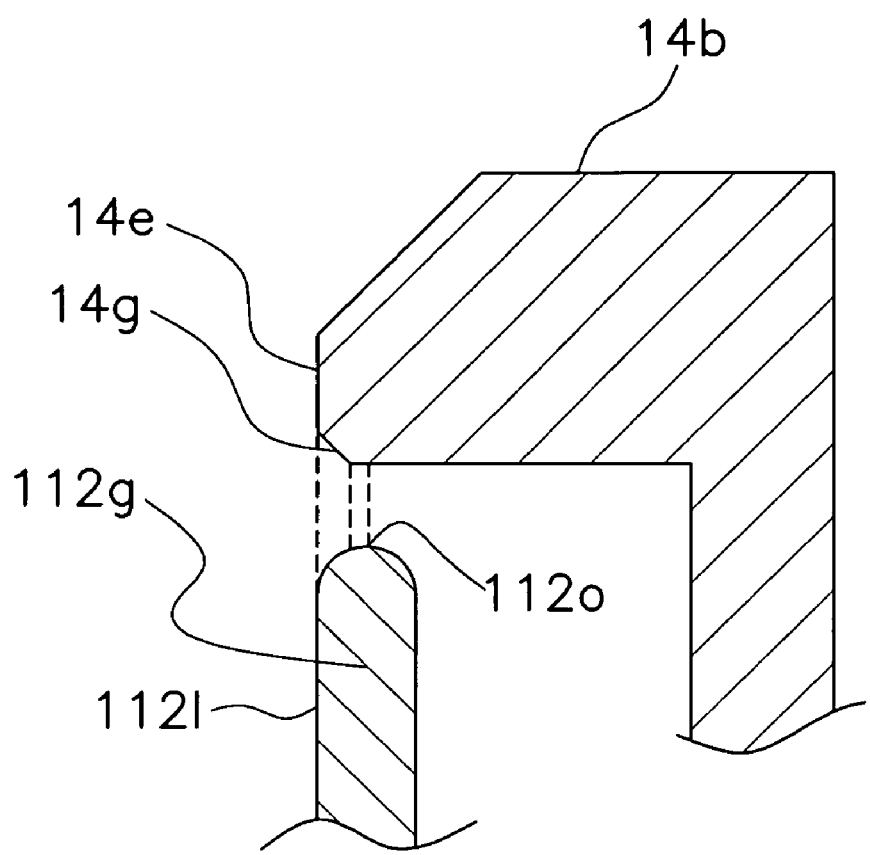
FIG. 16 is an enlarged partial cross-sectional view of a second fishing line entry prevention portion and a second annular portion of a spool assembly in accordance with a second embodiment of the present invention.

Referring now to FIG. 16, a spool assembly in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the first fishing line entry prevention portion 12*f* and the second fishing line entry prevention portion 12*g* are arranged so that the side surfaces 121 on the bobbin 12*a* side are positioned further on the bobbin 12*a* side than the tip surfaces of the first annular portion 14*a* and the second annular portion 14*b*. The spool assembly of the second embodiment is essentially the same as in the first embodiment except that side surfaces 1121 on a bobbin side of a first fishing line entry prevention portion (not shown) and a second fishing line entry prevention portion 112*g* may be arranged to be aligned with the tip surfaces 14*e* of the tip portions of the first annular portion 14*a* and the second annular portion 14*b*.

Furthermore, as shown in FIG. 16, the tapered portions 14*g* are positioned axially inward of an outermost diameter portion 112*o* of the tip portion of the first fishing line entry prevention portion and the second fishing line entry prevention portion 112*g*. The structural arrangement of the first fishing line entry prevention portion, for purposes of alignment with the first annular portion 14*a*, is the mirror image of the second fishing line entry prevention portion 112*g* shown in FIG. 16.

Third Embodiment

Figure 17:
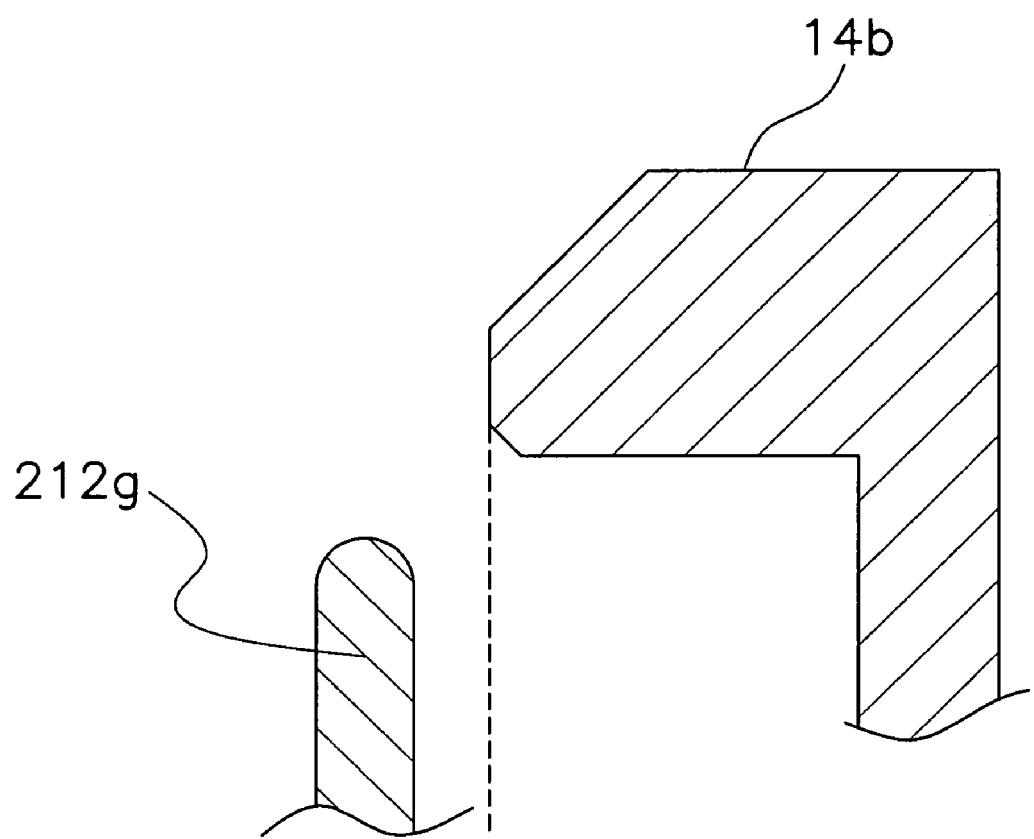
FIG. 17 is an enlarged partial cross-sectional view of a second fishing line entry prevention portion and a second annular portion of a spool assembly in accordance with a third embodiment of the present invention.

Referring now to FIG. 17, a spool assembly in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The spool assembly of the third embodiment is essentially the same as in the first embodiment except that a lateral surface on an axially outward side of a first fishing line entry prevention portion (not shown) is positioned more axially inward than the first tip portion of the first annular portion 14*a*. Likewise, a lateral surface on an axially outward side of a second fishing line entry prevention portion 212*g* is positioned more axially inward than the second tip portion of the second annular portion 14*b*. The structural arrangement of the first fishing line entry prevention portion, for purposes of alignment with the first annular portion 14*a*, is the mirror image of the second fishing line entry prevention portion 212*g* shown in FIG. 17.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately"

as used herein mean a reasonable amount of deviation of the modified term such that the end result is not significantly changed. These terms of degree should be construed as including a deviation of at least ±5% of the modified term if this deviation would not negate the meaning of the word it modifies.

What is claimed is:

1. A spool assembly for a dual bearing reel comprising:
a tubular bobbin having a first end portion, a second end portion and an outer periphery that supports fishing line;
a first flange portion that projects radially outward from the first end portion of the bobbin, the first flange portion having a first diagonal portion and a first cylindrical portion, the first diagonal portion extending axially outward from the first flange portion with a gradually increasing diameter, and the first cylindrical portion extending axially outward from the first diagonal portion with a uniform diameter;
a second flange portion that projects radially outward from the second end portion of the bobbin, the second flange portion having a second diagonal portion and a second cylindrical portion, the second diagonal portion extending axially outward from the second flange portion with a gradually increasing diameter, and the second cylindrical portion extending axially outward from the second diagonal portion with a uniform diameter;
a first annular portion that projects axially inward, the first annular portion having a first tip portion and an inner periphery that covers the first cylindrical portion;
a second annular portion that projects axially inward, the second annular portion having a second tip portion and an inner periphery that covers the second cylindrical portion;
a first fishing line entry prevention portion that projects from an outer periphery of the first cylindrical portion, the first fishing line entry prevention portion being arranged across a first gap from the first tip portion;
a second fishing line entry prevention portion that projects from an outer periphery of the second cylindrical portion, the second fishing line entry prevention portion being arranged across a second gap from the second tip portion; and
a tubular section that faces an axially outward side surface of one of the first and second fishing line entry prevention portions, the tubular section being arranged further axially outward than one of the first and second tip portion and having a center axis parallel to the to one of the first and second flange portions that is positioned between one of the first and second flange portions and the inner periphery of a corresponding one of the first and second annular portions.

2. The spool assembly for a dual bearing reel as set forth in claim 1, wherein
at least one of the first and second fishing line entry prevention portions is substantially perpendicular with the outer peripheral surface of a corresponding one of the first and second cylindrical portions, respectively.

3. The spool assembly for a dual bearing reel as set forth in claim 1, wherein
an annular grooves that opens laterally is formed in the tubular section and one of the first and second flange portions is in the annular groove.

4. The spool assembly for a dual bearing reel as set forth in claim 1, wherein one of the first and second annular portions and the tubular section are formed as a unitary one-piece member.

5. The spool assembly for a dual bearing reel as set forth in claim 1, wherein
the first annular portion and the tubular section are separately formed and the tubular section has a braking surface that is configured and arranged for braking rotation of a spool by contacting at least one of a plurality of moving members.

6. The spool assembly for a dual bearing reel as set forth in claim 1, wherein
an outermost prevention portion diameter of the first and second fishing line entry prevention portions is between about 105% and 115% of a maximum line winding diameter of the first and second flange portions.

7. The spool assembly for a dual bearing reel as set forth in claim 6, wherein
the outermost prevention portion diameter is between about 27 mm and 34 mm and the maximum line winding diameter is between about 25 mm and 30 mm.

8. The spool assembly for a dual bearing reel as set forth in claim 6, wherein
a projection height of the first and second fishing line entry prevention portions is between about 1.0 mm and 2.0 mm.

9. The spool assembly for a dual bearing reel as set forth in claim 6, wherein
a thickness of one of the first and second fishing line entry prevention portions is between about 0.1 mm and 0.5 mm.

10. The spool assembly for a dual bearing reel as set forth in claim 6, wherein
the maximum line winding diameter is equal to an outermost diameter of the first and second flange portions.

11. The spool assembly for a dual bearing reel as set forth in claim 6, wherein
an outer diameter of the bobbin is between about 20 mm and 28.5 mm.

12. The spool assembly for a dual bearing reel as set forth in 6, wherein
an inner diameter of the first and second annular portions is between about 28 mm and 35 mm.

13. The spool assembly for a dual bearing reel as set forth in claim 6, wherein
at least one of the first and second gaps is between about 0.1 mm and 0.5 mm.

14. A spool assembly for a dual bearing reel comprising:
a tubular bobbin having a first end portion, a second end portion and an outer periphery that supports fishing line;
a first flange portion that projects radially outward from the first end portion of the bobbin, the first flange portion having a first diagonal portion and a first cylindrical portion, the first diagonal portion extending axially outward from the first flange portion with a gradually increasing diameter, and the first cylindrical portion extending axially outward from the first diagonal portion with a uniform diameter;
a second flange portion that projects radially outward from the second end portion of the bobbin, the second flange portion having a second diagonal portion and a second cylindrical portion, the second diagonal portion extending axially outward from the second flange portion with a gradually increasing diameter, and the second cylindrical portion extending axially outward from the second diagonal portion with a uniform diameter;

a first annular portion that projects axially inward, the first annular portion having a first tip portion and an inner periphery that covers the first cylindrical portion;

a second annular portion that projects axially inward, the second annular portion having a second tip portion and an inner periphery that covers the second cylindrical portion;

a first fishing line entry prevention portion that projects from an outer periphery of the first cylindrical portion, the first fishing line entry prevention portion being arranged across a first gap from the first tip portion; and a second fishing line entry prevention portion that projects from an outer periphery of the second cylindrical portion, the second fishing line entry prevention portion being arranged across a second gap from the second tip portion, a lateral surface on a bobbin side of the first fishing line entry prevention portion being positioned more axially inward than the first tip portion of the first annular portion, and a lateral surface on a bobbin side of the second fishing line entry prevention portion being positioned more axially inward than the second tip portion of the second annular portion.

15. The spool assembly for a dual bearing reel as set forth in claim 1, wherein a lateral surface on a bobbin side of the first fishing line entry prevention portion is aligned with the first tip portion of the first annular portion, and a lateral surface on a bobbin side of the second fishing line entry prevention portion is aligned with the second tip portion of the second annular portion.

16. A spool assembly for a dual bearing reel comprising:

a tubular bobbin having a first end portion, a second end portion and an outer periphery that supports fishing line;

a first flange portion that projects radially outward from the first end portion of the bobbin, the first flange portion having a first diagonal portion and a first cylindrical portion, the first diagonal portion extending axially outward from the first flange portion with a gradually increasing diameter, and the first cylindrical portion extending axially outward from the first diagonal portion with a uniform diameter;

a second flange portion that projects radially outward from the second end portion of the bobbin, the second flange portion having a second diagonal portion and a second cylindrical portion, the second diagonal portion extending axially outward from the second flange portion with a gradually increasing diameter, and the second cylindrical portion extending axially outward from the second diagonal portion with a uniform diameter;

a first annular portion that projects axially inward, the first annular portion having a first tip portion and an inner periphery that covers the first cylindrical portion;

a second annular portion that projects axially inward, the second annular portion having a second tip portion and an inner periphery that covers the second cylindrical portion;

a first fishing line entry prevention portion that projects from an outer periphery of the first cylindrical portion, the first fishing line entry prevention portion being arranged across a first gap from the first tip portion; and a second fishing line entry prevention portion that projects from an outer periphery of the second cylindrical portion, the second fishing line entry prevention portion being arranged across a second gap from the second tip portion, a lateral surface on an axially outward side of the first fishing line entry prevention portion being positioned more axially inward than the first tip portion of the first annular portion, and a lateral surface on an axially outward side of the second fishing line entry prevention portion being positioned more axially inward than the second tip portion of the second annular portion.

17. The spool assembly for a dual bearing reel as set forth in claim 1, wherein each of the first and second fishing line entry prevention portions have a top portion that is in a tapered shape.

18. The spool assembly for a dual bearing reel as set forth in claim 17, wherein each of the first and second tip portions have a tapered portion with a diameter that increases from the inner periphery toward the respective tip portion, and an edge of the tapered portion is adjacent to the inner periphery and is positioned more axially inward than an outermost portion of the fishing line entry prevention portion.

* * * * *